(12) United States Patent
Kanaya et al.

(10) Patent No.: US 11,902,195 B2
(45) Date of Patent: Feb. 13, 2024

(54) COMMUNICATION SYSTEM, COMMUNICATION METHOD, COMMUNICATION DEVICE, AND MEDIUM WITH COMMUNICATION PROGRAM STORED THEREON

(71) Applicant: NINTENDO CO., LTD., Kyoto (JP)

(72) Inventors: Takumi Kanaya, Kyoto (JP); Yoshitaka Imura, Kyoto (JP); Takayuki Shibata, Kyoto (JP); Sho Kurose, Kyoto (JP); Weiwei Yan, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 296 days.

(21) Appl. No.: 17/363,786

(22) Filed: Jun. 30, 2021

(65) Prior Publication Data

US 2022/0103319 A1    Mar. 31, 2022

(30) Foreign Application Priority Data

Sep. 29, 2020   (JP) .................. 2020-163140

(51) Int. Cl.
| | |
|---|---|
| *H04W 4/00* | (2018.01) |
| *H04L 5/00* | (2006.01) |
| *H04W 76/10* | (2018.01) |
| *H04W 72/0453* | (2023.01) |
| *H04W 84/12* | (2009.01) |
| *H04W 88/08* | (2009.01) |

(52) U.S. Cl.
CPC ....... *H04L 5/0048* (2013.01); *H04W 72/0453* (2013.01); *H04W 76/10* (2018.02); *H04W 84/12* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 10,785,795 B2 * | 9/2020 | Son ................. | H04W 74/006 |
| 11,039,339 B1 * | 6/2021 | Khude .............. | H04W 80/02 |
| 11,677,598 B2 * | 6/2023 | Yu .................... | H04L 25/03866 |
| | | | 370/329 |

(Continued)

FOREIGN PATENT DOCUMENTS

| | | |
|---|---|---|
| GB | 2576723 | 3/2020 |
| JP | 2008-141363 | 6/2008 |

(Continued)

*Primary Examiner* — Bob A Phunkulh
(74) *Attorney, Agent, or Firm* — Nixon & Vanderhye PC

(57) ABSTRACT

A communication system includes a first communication device that configures a first wireless network together with another peripheral device or a plurality of other peripheral devices by using a first BSSID and a second communication device that configures a second wireless network together with another peripheral device or a plurality of other peripheral devices by using a second BSSID. The first communication device is configured to transmit a first frame in which a first identification value has been designated as a BSSID. The first communication device and the second communication device are configured to perform reception processing of a frame in which the first identification value has been designated as the BSSID, as a valid frame.

20 Claims, 17 Drawing Sheets

(56) References Cited

U.S. PATENT DOCUMENTS

| | | | |
|---|---|---|---|
| 11,678,382 B2* | 6/2023 | Wang | H04W 48/18 |
| | | | 370/329 |
| 2008/0130579 A1 | 6/2008 | Kurita et al. | |
| 2012/0220241 A1 | 8/2012 | Mizuguchi et al. | |
| 2017/0291105 A1 | 12/2017 | Kondo et al. | |
| 2018/0035338 A1 | 2/2018 | Wang et al. | |
| 2018/0302923 A1* | 10/2018 | Patil | H04W 74/008 |
| 2019/0075607 A1* | 3/2019 | Park | H04W 76/14 |
| 2019/0089763 A1* | 3/2019 | Park | H04L 65/1069 |
| 2019/0150063 A1 | 5/2019 | Chu et al. | |
| 2020/0036618 A1 | 1/2020 | Asterjadhi et al. | |
| 2020/0154398 A1* | 5/2020 | Kim | H04W 84/12 |
| 2021/0036809 A1* | 2/2021 | Shellhammer | H04B 7/0456 |
| 2021/0076437 A1* | 3/2021 | Kneckt | H04W 76/11 |
| 2021/0204324 A1* | 7/2021 | Viger | H04W 72/121 |
| 2021/0314799 A1* | 10/2021 | Sugaya | H04B 17/318 |
| 2021/0392705 A1* | 12/2021 | Jeong | H04W 76/14 |
| 2022/0078644 A1* | 3/2022 | Chennichetty | H04W 4/021 |
| 2022/0394606 A1* | 12/2022 | Yang | H04W 48/18 |
| 2023/0032301 A1* | 2/2023 | Hong | H04L 5/0094 |
| 2023/0038358 A1* | 2/2023 | Dong | H04W 72/0453 |

FOREIGN PATENT DOCUMENTS

| | | |
|---|---|---|
| JP | 2012-176127 | 9/2012 |
| JP | 2015/002412 | 1/2015 |
| JP | 2016-163178 | 9/2016 |
| JP | 2017-191966 | 10/2017 |
| JP | 2018-019402 | 2/2018 |
| WO | 2013/153617 | 12/2015 |
| WO | 2018/160994 | 9/2018 |
| WO | 2020/043433 | 3/2020 |

\* cited by examiner

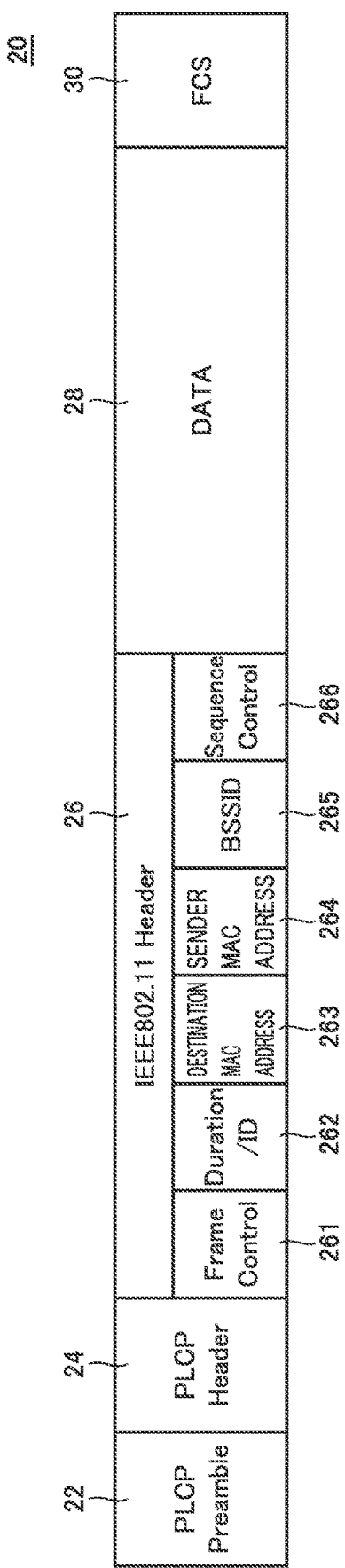

FIG.6

| Case | DESTINATION MAC ADDRESS | SENDER MAC ADDRESS | BSSID | PERIPHERAL DEVICE 200_1 | PERIPHERAL DEVICE 200_2 | PERIPHERAL DEVICE 200_3 | PERIPHERAL DEVICE 200_4 | PERIPHERAL DEVICE 200_5 | PERIPHERAL DEVICE 200_6 | COMMUNICATION DEVICE 100_2 |
|---|---|---|---|---|---|---|---|---|---|---|
| 1 | PERIPHERAL DEVICE 200_1 | COMMUNICATION DEVICE 100_1 | BSS_1 | ✓ | | | | | | |
| 2 | PERIPHERAL DEVICE 200_1 | COMMUNICATION DEVICE 100_1 | Broadcast | ✓ | | | | | | |
| 3 | PERIPHERAL DEVICE 200_2 | COMMUNICATION DEVICE 100_1 | BSS_1 | | ✓ | | | | | |
| 4 | PERIPHERAL DEVICE 200_2 | COMMUNICATION DEVICE 100_1 | Broadcast | | ✓ | | | | | |
| 5 | PERIPHERAL DEVICE 200_3 | COMMUNICATION DEVICE 100_1 | BSS_1 | | | ✓ | | | | |
| 6 | PERIPHERAL DEVICE 200_3 | COMMUNICATION DEVICE 100_1 | Broadcast | | | ✓ | | | | |
| 7 | COMMUNICATION DEVICE 100_2 | COMMUNICATION DEVICE 100_1 | BSS_1 | | | | | | | |
| 8 | COMMUNICATION DEVICE 100_2 | COMMUNICATION DEVICE 100_1 | Broadcast | | | | | | | ✓ |
| 9 | Broadcast | COMMUNICATION DEVICE 100_1 | BSS_1 | ✓ | ✓ | ✓ | | | | |
| 10 | Broadcast | COMMUNICATION DEVICE 100_1 | Broadcast | ✓ | ✓ | ✓ | ✓ | ✓ | ✓ | ✓ |

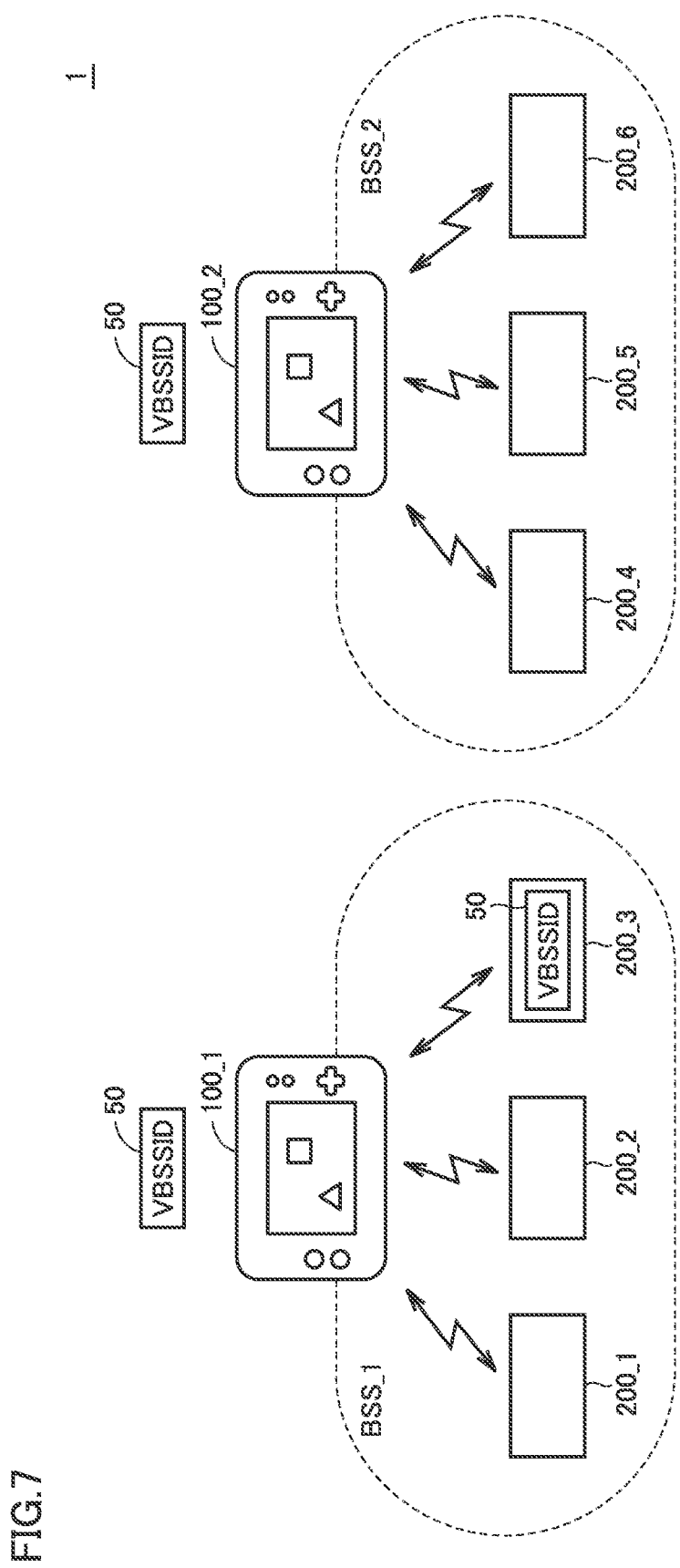

FIG.8

| Case | DESTINATION MAC ADDRESS | SENDER MAC ADDRESS | BSSID | PERIPHERAL DEVICE 200_1 | PERIPHERAL DEVICE 200_2 | PERIPHERAL DEVICE 200_3 | PERIPHERAL DEVICE 200_4 | PERIPHERAL DEVICE 200_5 | PERIPHERAL DEVICE 200_6 | COMMUNICATION DEVICE 100_2 |
|---|---|---|---|---|---|---|---|---|---|---|
| 1 | PERIPHERAL DEVICE 200_1 | COMMUNICATION DEVICE 100_1 | BSS_1 | ✓ | | | | | | |
| 2 | PERIPHERAL DEVICE 200_1 | COMMUNICATION DEVICE 100_1 | Broadcast | ✓ | | | | | | |
| 3 | PERIPHERAL DEVICE 200_1 | COMMUNICATION DEVICE 100_1 | VBSSID | | | | | | | |
| 4 | PERIPHERAL DEVICE 200_2 | COMMUNICATION DEVICE 100_1 | BSS_1 | | ✓ | | | | | |
| 5 | PERIPHERAL DEVICE 200_2 | COMMUNICATION DEVICE 100_1 | Broadcast | | ✓ | | | | | |
| 6 | PERIPHERAL DEVICE 200_2 | COMMUNICATION DEVICE 100_1 | VBSSID | | | | | | | |
| 7 | PERIPHERAL DEVICE 200_3 | COMMUNICATION DEVICE 100_1 | BSS_1 | | | ✓ | | | | |
| 8 | PERIPHERAL DEVICE 200_3 | COMMUNICATION DEVICE 100_1 | Broadcast | | | ✓ | | | | |
| 9 | PERIPHERAL DEVICE 200_3 | COMMUNICATION DEVICE 100_1 | VBSSID | | | ✓ | | | | |
| 10 | COMMUNICATION DEVICE 100_2 | COMMUNICATION DEVICE 100_1 | BSS_1 | | | | | | | |
| 11 | COMMUNICATION DEVICE 100_2 | COMMUNICATION DEVICE 100_1 | Broadcast | | | | | | | |
| 12 | COMMUNICATION DEVICE 100_2 | COMMUNICATION DEVICE 100_1 | VBSSID | | | ✓ | | | | |
| 13 | Broadcast | COMMUNICATION DEVICE 100_1 | BSS_1 | ✓ | ✓ | | | | | ✓ |
| 14 | Broadcast | COMMUNICATION DEVICE 100_1 | roadcast | ✓ | ✓ | ✓ | ✓ | ✓ | ✓ | ✓ |
| 15 | Broadcast | COMMUNICATION DEVICE 100_1 | VBSSID | | | ✓ | | | | ✓ |

| VIRTUAL BSSID | CHANNEL | ATTRIBUTE INFORMATION |
|---|---|---|
| 02:09:BF:85:A1:24 | 1ch | USER A |
| 02:09:BF:45:5A:78 | 11ch | USER B |
| 02:09:BF:87:D5:31 | 1ch | USER C |
| ⋮ | ⋮ | ⋮ |

COMMUNICATION SYSTEM, COMMUNICATION METHOD, COMMUNICATION DEVICE, AND MEDIUM WITH COMMUNICATION PROGRAM STORED THEREON

This nonprovisional application is based on Japanese Patent Application No. 2020-163140 filed with the Japan Patent Office on Sep. 29, 2020, the entire contents of which are hereby incorporated by reference.

FIELD

The present disclosure relates to a communication system, a communication method, a communication device, and a communication program for configuring a wireless network with the use of a basic service set identifier (BSSID).

BACKGROUND AND SUMMARY

In typical wireless communication, a wireless network is configured among a plurality of communication devices. In connection with communication over a plurality of wireless networks, a game system has been known, in which, even when specific game devices form a communication group and communicate with one another, other game devices present within a range where they can receive a frame broadcast from that communication group can obtain various types of information such as information on progress of a game application executed in the communication group.

The present disclosure provides a configuration in which each communication device uses a plurality of wireless networks independent of one another and continues communication in each of them.

An exemplary embodiment provides a communication system that includes a first communication device that configures a first wireless network together with another peripheral device or a plurality of other peripheral devices by using a first basic service set identifier (BSSID) and a second communication device that configures a second wireless network together with another peripheral device or a plurality of other peripheral devices by using a second BSSID. The first BSSID is identical to a media access control (MAC) address of the first communication device. The second BSSID is identical to the MAC address of the second communication device. The first communication device and the second communication device are common in first identification value. The first communication device is configured to transmit a first frame in which the first identification value has been designated as a BSSID and to perform reception processing of a frame in which the first identification value has been designated as the BSSID, as a valid frame, in addition to a frame in which the first BSSID has been designated as the BSSID. The second communication device is configured to perform reception processing of the frame in which the first identification value has been designated as the BSSID, as the valid frame, in addition to a frame in which the second BSSID has been designated as the BSSID.

According to this configuration, for the first identification value held in common between the first communication device and the second communication device, the first communication device performs reception processing of the frame in which the first identification value has been designated as the BSSID, as the valid frame, in addition to the frame in which the first BSSID has been designated as the BSSID, and the second communication device performs reception processing of the frame in which the first identification value has been designated as the BSSID, as the valid frame, in addition to the frame in which the second BSSID has been designated as the BSSID. As a result of reception processing in the first communication device and the second communication device, with the first wireless network and the second wireless network being maintained, an independent wireless network different therefrom can be configured. With such an independent wireless network, data can readily directly be exchanged between the first communication device and the second communication device.

The first communication device may be configured to transmit a second identification value different from the first identification value by using the first frame. The second communication device may be configured to receive the first frame and to store the second identification value included in the first frame. According to this configuration, the second identification value valid only between the first communication device and the second communication device can be held in common.

The second communication device may store the second identification value included in the first frame in response to an operation by a user. According to this configuration, only when an explicit operation by the user is performed, the independent wireless network different from the first wireless network and the second wireless network is configured. Therefore, consumption of an unnecessary wireless resource can be prevented.

The first communication device and the second communication device may be configured to exchange data in a second frame in which the second identification value has been designated as the BSSID, after the second communication device stores the second identification value. According to this configuration, a wireless network using the second identification value valid between the first communication device and the second communication device can be configured. Therefore, in data exchange between the first communication device and the second communication device, influence on another device present around them can be lessened.

A broadcast address may be designated as a destination MAC address in the first frame. The MAC address of the first communication device or the second communication device may be designated as the destination MAC address in the second frame. According to this configuration, search for a first frame by a communication device that desires reception of the first frame can be facilitated, and in data exchange between the first communication device and the second communication device, influence on another device present around them can be lessened.

The first communication device may transmit the first frame through a communication channel identical to a communication channel used for communication over the first wireless network, and the second communication device may search for the first frame by sequentially changing the communication channel According to this configuration, the first frame can be transmitted while communication over the first wireless network is stable.

The second communication device may communicate over the second wireless network through the communication channel used for transmission of the first frame. According to this configuration, both of communication over the first wireless network and communication between the first communication device and the second communication device can be stabilized.

The first communication device and the second communication device may execute an application program. The first identification value may be included in the application program. According to this configuration, it can be ensured that the communication devices that execute the identical application program hold the first identification value in common.

The second identification value may be generated by changing a value of a specific bit in the MAC address of the first communication device. According to this configuration, under predetermined rules for the MAC address, the second identification value that does not overlap or collide with another MAC address can readily be determined.

The first identification value and the second identification value may be set to a value different from all of the MAC address of the first communication device, the MAC address of the second communication device, and a broadcast address. According to this configuration, independence from an existing wireless network can be ensured.

An identical communication channel may be used in communication over the first wireless network, communication over the second wireless network, and communication between the first communication device and the second communication device. According to this configuration, communication over the first wireless network, communication over the second wireless network, and communication between the first communication device and the second communication device can all be stabilized.

Another exemplary embodiment provides a communication method that includes configuring, by a first communication device, a first wireless network together with another peripheral device or a plurality of other peripheral devices by using a first BSSID. The first BSSID is identical to a MAC address of the first communication device. The communication method includes configuring, by a second communication device, a second wireless network together with another peripheral device or a plurality of other peripheral devices by using a second BSSID. The second BSSID is identical to the MAC address of the second communication device. The communication method includes configuring the first communication device to perform reception processing of a frame in which a first identification value has been designated as a BSSID, as a valid frame, in addition to a frame in which the first BSSID has been designated as the BSSID, configuring the second communication device to perform reception processing of the frame in which the first identification value has been designated as the BSSID, as the valid frame, in addition to a frame in which the second BSSID has been designated as the BSSID, and transmitting, by the first communication device, a first frame in which the first identification value has been designated as the BSSID.

Another exemplary embodiment provides a communication device including a wireless communication unit. The communication device includes a module for configuring a first wireless network together with another peripheral device or a plurality of other peripheral devices by using a first BSSID. The first BSSID is identical to a MAC address of the communication device. The communication device includes a module for storing a first identification value in common to another communication device that configures a second wireless network together with another peripheral device or a plurality of other peripheral devices by using a second BSSID. The second BSSID is identical to the MAC address of another communication device. The communication device includes a module for performing reception processing of a frame in which the first identification value has been designated as a BSSID, as a valid frame, in addition to a frame in which the first BSSID has been set as the BSSID, and a module for transmitting a first frame in which the first identification value has been designated as the BSSID.

Another exemplary embodiment provides a non-transitory computer-readable storage medium with an executable communication program stored thereon. The communication program is executed in a computer including a wireless communication unit. The communication program causes the computer to perform configuring a first wireless network together with another peripheral device or a plurality of other peripheral devices by using a first BSSID. The first BSSID is identical to a MAC address of the computer. The communication program causes the computer to perform storing a first identification value in common to another communication device that configures a second wireless network together with another peripheral device or a plurality of other peripheral devices by using a second BSSID. The second BSSID is identical to the MAC address of another communication device. The communication program causes the computer to perform reception processing of a frame in which the first identification value has been designated as the BSSID, as a valid frame, in addition to a frame in which the first BSSID has been designated as the BSSID, and transmitting a first frame in which the first identification value has been designated as the BSSID.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 5 shows an exemplary illustrative non-limiting drawing illustrating an exemplary frame format in conformity with IEEE 802.11 standards.

FIG. 6 shows an exemplary illustrative non-limiting drawing illustrating frame transmission in conformity with IEEE 802.11 standards.

FIG. 7 shows an exemplary illustrative non-limiting drawing illustrating an example in which a specific communication device includes a virtual BSSID in the communication system shown in FIG. 1.

FIG. 8 shows an exemplary illustrative non-limiting drawing illustrating frame transmission in the communication system shown in FIG. 7.

DETAILED DESCRIPTION OF NON-LIMITING EXAMPLE EMBODIMENTS

Figure 1:
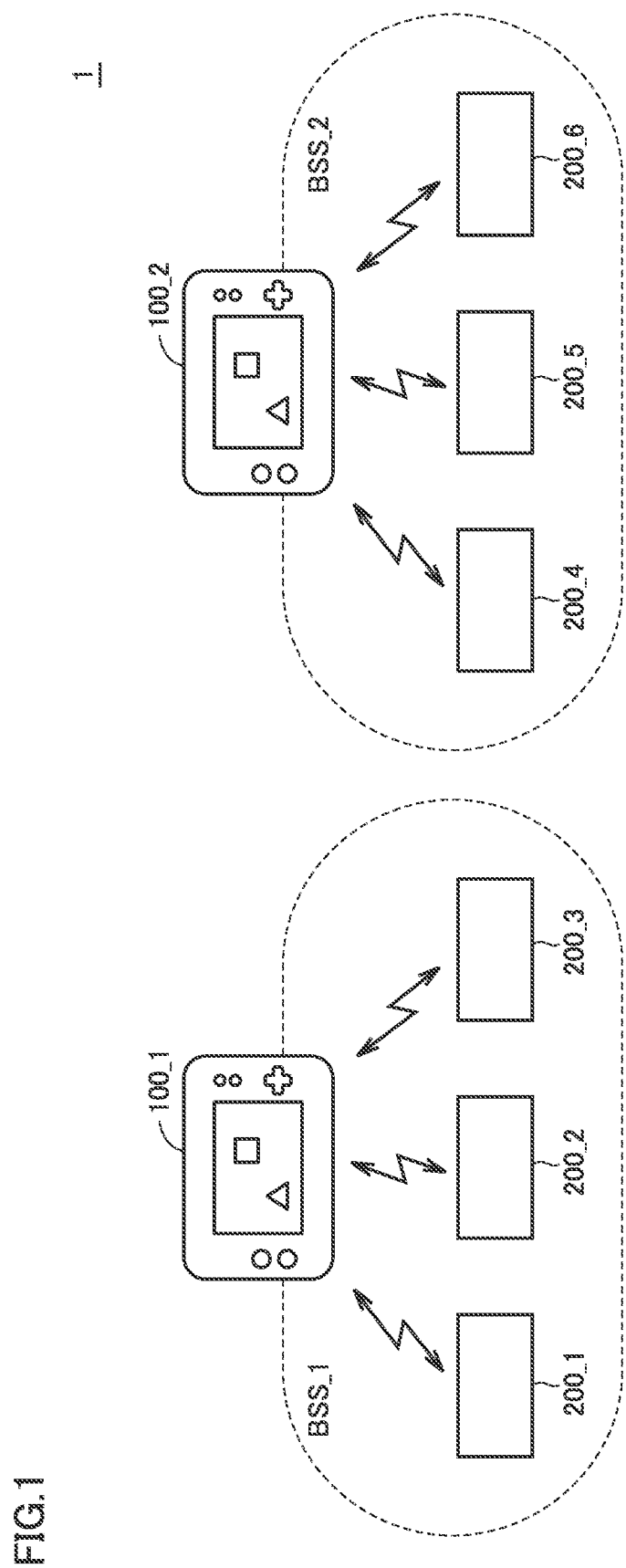
FIGS. 1 to 3 show exemplary illustrative non-limiting drawings illustrating overview of a communication system according to the present embodiment.

The present embodiment will be described in detail with reference to the drawings. The same or corresponding elements in the drawings have the same reference characters allotted and description thereof will not be repeated.

[A. Overview]

Overview of a communication system 1 according to the present embodiment will initially be described with reference to FIGS. 1 to 3.

Communication system 1 according to the present embodiment includes a plurality of communication devices 100_1, 100_2, . . . and peripheral devices 200_1, 200_2, . . . , 200_6, . . . that can exchange information with one another through wireless communication. In the description below, communication devices 100_1, 100_2, . . . may collectively be referred to as a "communication device 100" and peripheral devices 200_1, 200_2, . . . , 200_6, . . . may collectively be referred to as a "peripheral device 200." Peripheral device 200 also falls under a communication device in a broad sense.

For example, a wireless local area network (LAN) in conformity with Institute of Electrical and Electronics Engineers (IEEE) 802.11 standards can be employed for wireless communication. "IEEE 802.11 standards" herein is a term encompassing not only IEEE 802.11 (defined in 1997) in the narrow sense but also all standards (for example, IEEE 802.11b, IEEE 802.11g, and IEEE 802.11n) derived from IEEE 802.11. Furthermore, "IEEE 802.11 standards" may encompass also newly derived standards that will be defined in the future.

FIG. 1 shows an exemplary communication state in an infrastructure mode defined under the IEEE 802.11 standards. In the infrastructure mode, one communication device operates as an access point (AP; which is simply also abbreviated as an "AP" below) and one communication device or a plurality of communication devices is/are connected to the AP. One communication device or a plurality of communication devices connected to the AP operate(s) as station(s) (STA; which is/are also simply abbreviated as an "STA(s)" below). An operation as the AP can also be regarded as meaning a "parent" and an operation as the STA can also be regarded as meaning a "child".

For the sake of convenience of description, communication device 100 means a communication device operable at least as an AP and peripheral device 200 means a communication device operable at least as an STA. Communication device 100 and peripheral device 200 may be identical to each other in configuration. In this case, communication device 100 and peripheral device 200 operate as APs and/or STAs depending on a situation.

In the infrastructure mode, one AP and one STA or a plurality of STAs configure a wireless network. The wireless network in which the AP plays a dominant role is referred to as a basic service set (BSS) and a basic service set identifier (BSSID) is used as an identifier that uniquely specifies each wireless network (BSS). Typically, a media access control (MAC) address of a communication device that operates as the AP is adopted as the BSSID.

In FIG. 1, communication devices 100_1 and 100_2 operate as the APs. The BSSID of the wireless network in which communication device 100_1 plays a dominant role is assumed as "BSS_1" and the BSSID of the wireless network in which communication device 100_2 plays a dominant role is assumed as "BSS_2". Normally, a value of "BSS_1" is identical to the MAC address of communication device 100_1 and a value of "BSS_2" is identical to the MAC address of communication device 100_2.

Peripheral devices 200_1 to 200_3 are connected as the STAs to BSS_1, and peripheral devices 200_4 to 200_6 are connected as the STAs to BSS_2.

Communication device 100_1 that operates as the AP thus configures the wireless network together with one peripheral device 200 or a plurality of peripheral devices 200 by using the BSSID that is identical to the MAC address of communication device 100_1. Similarly, communication device 100_2 that operates as the AP configures the wireless network together with one peripheral device 200 or the plurality of peripheral devices 200 by using the BSSID that is identical to the MAC address of communication device 100_2.

In communication system 1 according to the present embodiment, another wireless network can virtually be configured while the wireless network as shown in FIG. 1 is maintained.

Figure 2:
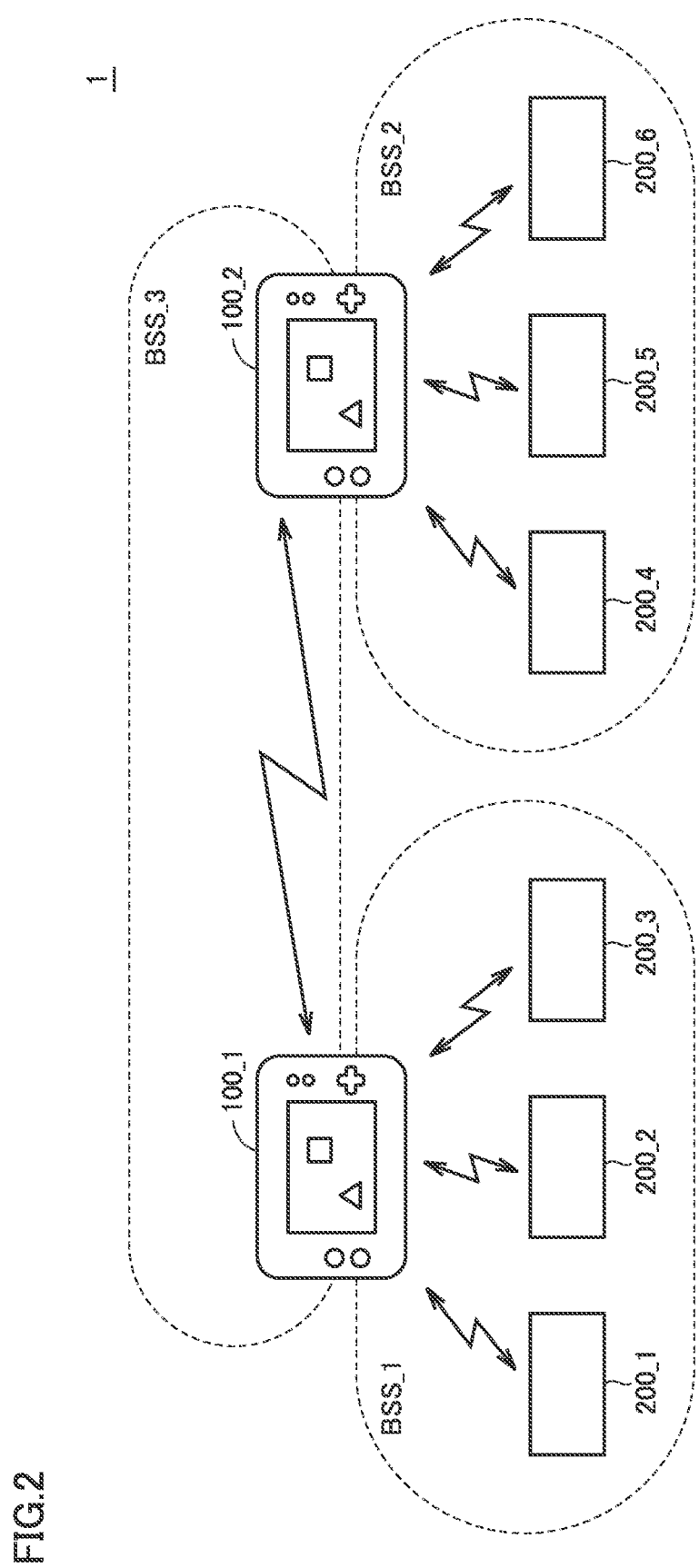

For example, as shown in FIG. 2, a wireless network with another BSSID (in this example, "BSS_3") can be configured between communication device 100_1 that operates as the AP in BSS_1 and communication device 100_2 that operates as the AP in BSS_2.

In the example shown in FIG. 2, any one of communication devices 100_1 and 100_2 may operate as the AP of BSS_3 and the other may operate as the STA of BSS_3, or the AP and the STA do not have to strictly be distinguished from each other.

Figure 3:
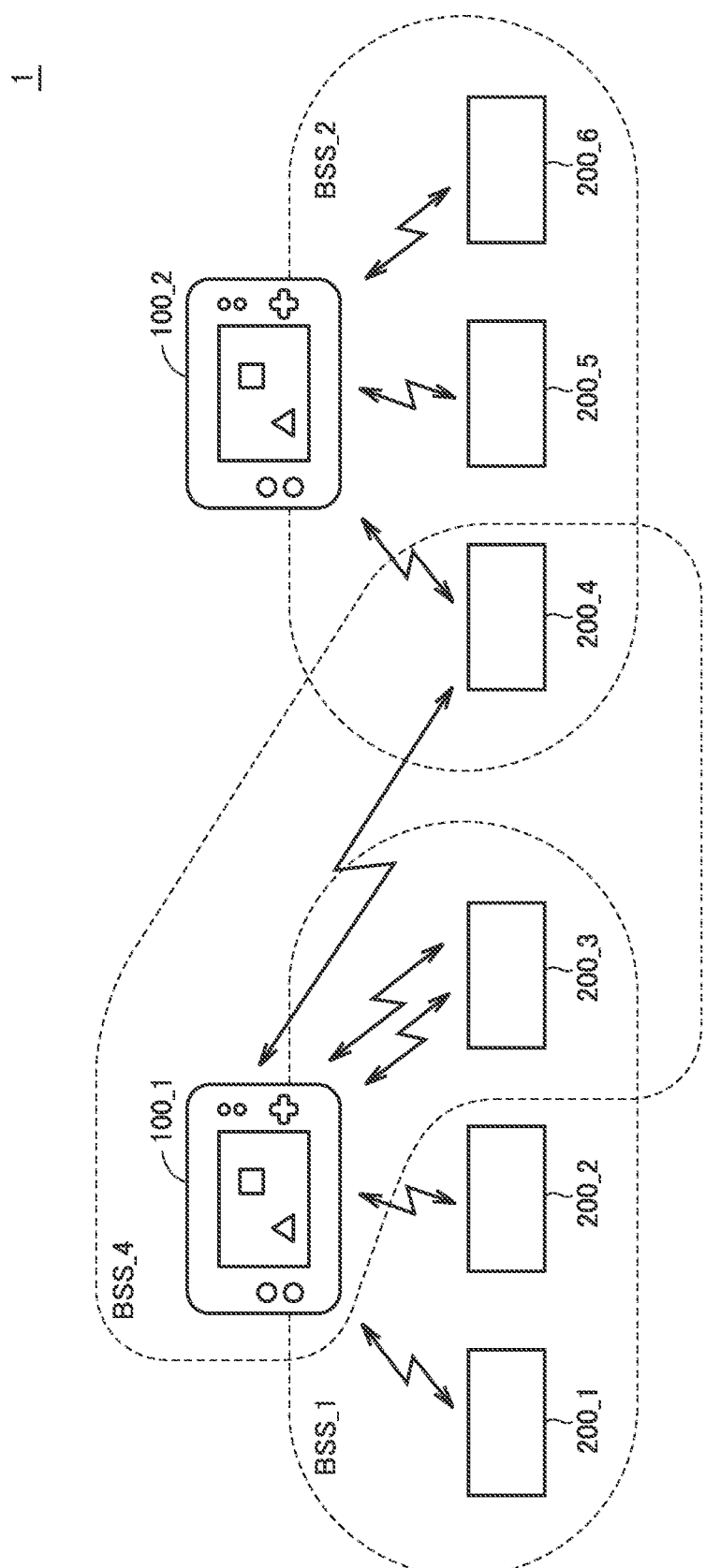

Alternatively, as shown in FIG. 3, a wireless network with yet another different BSSID (in this example, "BSS_4") can also be configured among communication device 100_1 that operates as the AP in BSS_1 and peripheral device 200_3 that operates as the STA in BSS_1 and peripheral device 200_4 that operates as the STA in BSS_2.

Thus, in communication system 1 according to the present embodiment, an arbitrary communication device can configure another wireless network or can participate in another wireless network while it maintains an arbitrary wireless network.

[B. Exemplary Hardware Configuration]

An exemplary hardware configuration of a device that configures communication system 1 according to the present embodiment will now be described.

(b1: Communication Device 100)

Any communication device may be applicable as communication device 100 included in communication system 1 according to the present embodiment. By way of example, a game device with a wireless communication function can be provided. A portable (or mobile) or stationary game device may be applicable.

An exemplary hardware configuration of communication device 100 included in communication system 1 according to the present embodiment will be described with reference to FIG. 4. Communication device 100 represents an exemplary computer, and includes a processor 102, a main storage 104, an auxiliary storage 106, a display 114, an operation unit 116, an audio output unit 118, and a wireless communication unit 120. These components are connected to communicate data with one another through a bus 112.

Processor 102 is a processing entity (processing means) that performs processing provided by communication device 100. Processor 102 reads a system program 108 and an application program 110 stored in auxiliary storage 106, develops the program on main storage 104, and performs various types of information processing as will be described later.

System program 108 includes an instruction code for implementing each type of processing as will be described later. In particular, system program 108 includes a communication program according to the present embodiment.

Main storage 104 is an arbitrary storage device (storage medium) that can be accessed by processor 102, and implemented, for example, by a volatile storage device such as a dynamic random access memory (DRAM).

Auxiliary storage 106 is implemented, for example, by a non-volatile storage medium such as a hard disk or a flash memory. Alternatively, auxiliary storage 106 may be implemented, for example, by a storage medium attachable to and removable from communication device 100 such as an optical disc and a cartridge. In this case, a combination of communication device 100 and an arbitrary storage medium may implement a communication device.

Display 114 shows an image generated as a result of information processing performed by processor 102. An image received from another device may also be shown on display 114. A plurality of displays 114 may be provided. Alternatively, communication device 100 may be configured to use a single external display or a plurality of external displays.

Operation unit 116 mainly accepts an operation from a user of communication device 100. Operation unit 116 is implemented, for example, by a push button, a control lever, a touch panel, a mouse, and the like. Operation unit 116 may be a game controller that is separate from communication device 100 and connected through a wire or wirelessly.

Wireless communication unit 120 transmits and receives data to and from another device through a wireless signal. Wireless communication unit 120 supports a wireless LAN, for example, in conformity with the IEEE 802.11 standards. In addition, wireless communication unit 120 may support a communication scheme such as Bluetooth®, ZigBee®, or infrared communication. Though FIG. 4 collectively shows a block of wireless communication unit 120, a plurality of wireless communication units 120 independent of one another may be implemented. Alternatively, wireless communication unit 120 may be integrated with processor 102.

Figure 4:
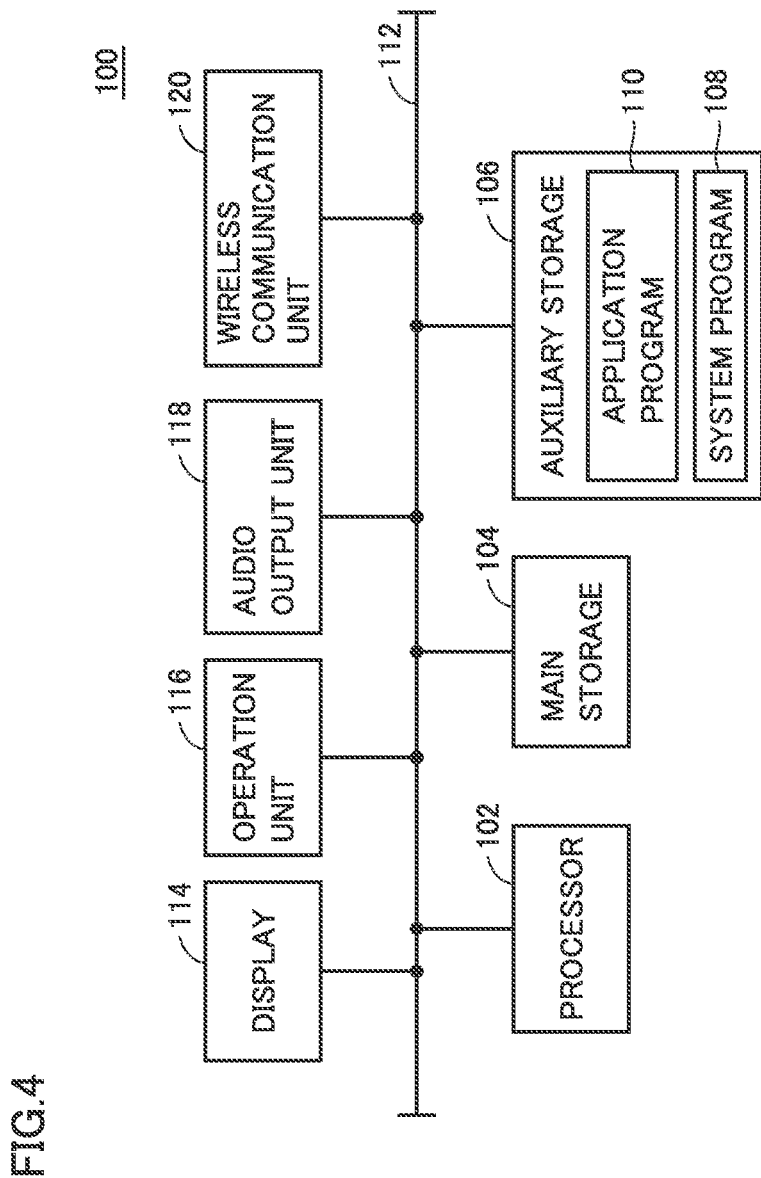
FIG. 4 shows an exemplary illustrative non-limiting drawing illustrating a hardware configuration of a communication device included in the communication system according to the present embodiment.

Though FIG. 4 shows communication device 100 as an integrated device, the communication device may be implemented as an assembly of a plurality of devices. In other words, communication device 100 may be implemented by combination of a plurality of independent devices. For example, a configuration in which a main body including hardware corresponding to processor 102, main storage 104, and auxiliary storage 106 and a terminal including hardware corresponding to display 114, operation unit 116, and audio output unit 118 are separate from each other may be adopted. Such a configuration may be referred to as a communication system, rather than communication device 100.

At least a part of information processing performed in communication device 100 may be performed discretely by another device or a plurality of other devices arranged as being distributed over a network (a wide area network and/or a local network).

(b2: Peripheral Device 200)

Any device may again be applicable as peripheral device 200 included in communication system 1 according to the present embodiment. For example, peripheral device 200 can be a general-purpose information processing apparatus such as a laptop personal computer, a desktop personal computer, a portable telephone, a smartphone, and a tablet. Alternatively, peripheral device 200 may be a peripheral (for example, a game controller or a speaker) connected to a game device. Since such a device itself has been known, detailed description thereof will not be given.

(b3: Others)

As described above, communication device 100 and peripheral device 200 are distinguished from each other for the sake of convenience of description and communication device 100 and peripheral device 200 may be identical to each other in hardware configuration. Typically, all of communication devices 100 and peripheral devices 200 may be game devices.

Processing in communication device 100 and/or peripheral device 200 may be performed by execution of a program by the processor, or a part or the entirety thereof may be implemented by hard-wired circuitry such as a system on chip (SoC), an application specific integrated circuit (ASIC), or a field programmable gate array (FPGA). A part or the entirety of the hard-wired circuitry may be implemented in wireless communication unit 120.

[C. BSSID and Virtual BSSID]

A BSSID and a virtual BSSID in connection with wireless communication in communication system 1 according to the present embodiment will now be described.

An exemplary frame format in conformity with the IEEE 802.11 standards will be described with reference to FIG. 5. A frame format 20 includes a physical layer convergence protocol (PLCP) preamble 22, a PLCP header 24, an IEEE 802.11 header 26, a data field 28, and an FCS field 30.

PLCP preamble 22 and PLCP header 24 include information on transmission through the physical layer. Specifically, PLCP preamble 22 is provided at the top of frame format 20 and includes a bit string indicating a synchronous signal. PLCP header 24 includes information on a modulation scheme and a data length.

IEEE 802.11 header 26 includes information on transmission through the data link layer. More specifically, IEEE 802.11 header 26 includes a frame control field 261, a Duration/ID field 262, a destination MAC address field 263, a sender MAC address field 264, a BSSID field 265, and a sequence control field 266.

Frame control field 261 includes information on a type of a frame, a destination of a frame, a frame sender medium (any of a wireless medium or a wired medium), fragment information, power management information, and whether or not to use wired equivalent privacy (WEP).

Duration/ID field 262 includes information on a period necessary for frame transmission.

Destination MAC address field 263 includes a MAC address of a communication device designated as a destination.

Sender MAC address field 264 includes a MAC address of a communication device designated as a sender.

BSSID field 265 includes a value of a BSSID of a wireless network to which communication devices designated as the sender and the destination belong.

Sequence control field 266 includes information for reconfiguring a plurality of frames.

A data main body to be transmitted is stored in data field 28.

FCS field 30 includes a frame check sequence (FCS) which is a check bit string for detecting an error that occurs during transmission.

Basically, frame transmission between communication devices is controlled based on information included in IEEE 802.11 header 26. More specifically, a communication device that receives and processes a frame from a sender communication device is determined by combination of a destination MAC address (a value designated in destination MAC address field 263 in FIG. 5) that specifies a transmission destination and a BSSID (a value designated in BSSID field 265 in FIG. 5). In other words, the communication device that has received a frame from any communication device determines whether or not the frame is directed to the communication device itself based on contents in IEEE 802.11 header 26 included in the received frame. When the communication device determines the frame as being directed to the communication device itself, it analyzes contents in the received frame and performs necessary processing. When the communication device determines the frame as not being directed to the communication device itself, it discards the received frame without analyzing contents therein.

Exemplary frame transmission under the IEEE 802.11 standards will be described with reference to FIG. 6. FIG. 6 shows an example in which communication device 100_1 transmits a frame when two wireless networks shown in FIG. 1 are present. The check mark in FIG. 6 means analysis and processing of contents in the received frame. It is assumed that communication devices 100_1 and 100_2 and peripheral devices 200_1 to 200_6 are present at positions proximate to one another and each communication device is able to receive a frame from other communication devices.

In Case 1 in FIG. 6, the MAC address of peripheral device 200_1 is designated as the destination MAC address and BSS_1 is designated as the BSSID. In this case, only peripheral device 200_1 analyzes and processes contents in a frame from communication device 100_1.

For each of the destination MAC address and the BSSID, a broadcast address (FF:FF:FF:FF:FF:FF) that means "all" instead of a specific value can also be designated (shown as "Broadcast" in FIG. 6).

In Case 2 in FIG. 6, the MAC address of peripheral device 200_1 is designated as the destination MAC address and a broadcast address is designated as the BSSID. In this case as well, only peripheral device 200_1 analyzes and processes contents in a frame from communication device 100_1.

Under the IEEE 802.11 standards, only the BSSID of the wireless network to which a sender communication device belongs or a broadcast address is permitted as the value of the BSSID in IEEE 802.11 header 26.

As shown in Case 1 and Case 2 in FIG. 6, when a specific value is designated as the destination MAC address, only the communication device having the designated value analyzes and processes contents in the received frame on condition that the BSSID matches with the specific value.

Similarly, in Case 3 and Case 4 in FIG. 6, the MAC address of peripheral device 200_2 is designated as the destination MAC address, and only peripheral device 200_2 analyzes and processes contents in a frame from communication device 100_1.

In Case 5 and Case 6 in FIG. 6, the MAC address of peripheral device 200_3 is designated as the destination MAC address, and only peripheral device 200_3 analyzes and processes contents in a frame from communication device 100_1.

In Case 7 in FIG. 6, the MAC address of communication device 100_2 is designated as the destination MAC address, and BSS_1 is designated as the BSSID. In this case, though communication device 100_2 determines that the MAC address of the communication device itself has been designated in the received frame, "BSS_1" which is the value of the designated BSSID does not match with "BSS_2" which is a value of the BSSID of the wireless network to which the communication device itself belongs. Therefore, communication device 100_2 discards the received frame.

In Case 8 in FIG. 6, the MAC address of communication device 100_2 is designated as the destination MAC address and the broadcast address is designated as the BSSID. In this case, communication device 100_2 determines that the MAC address of the communication device itself is designated in the received frame, and the broadcast address is designated as the BSSID. Therefore, communication device 100_2 analyzes and processes contents in the frame from communication device 100_1.

With designation as shown in Case 8 in FIG. 6, a frame can be transmitted from communication device 100_1 belonging to BSS_1 to communication device 100_2 belonging to BSS_2 which is a different wireless network. Since it is not easy to obtain a MAC address of a communication device belonging to a wireless network different in BSSID, generation of a frame as shown in Case 8 in FIG. 6 is not realistic. Such a frame is not suitable for such an application as transmitting identical data to a plurality of destinations. In other words, frames as many as destinations should be generated and transmitted, and load imposed on a transmission-side communication device 100 may become heavy.

In Case 9 in FIG. 6, the broadcast address is designated as the destination MAC address, and BSS_1 is designated as the BSSID. In this case, all communication devices (peripheral devices 200_1 to 200_3) belonging to BSS_1 analyze and process contents in a frame from communication device 100_1. Case 9 in FIG. 6 is effective in transmission of a frame at once to STAs belonging to an identical wireless network.

A frame, however, cannot be transmitted from communication device 100_1 to communication device 100_2 and peripheral devices 200_4 to 200_6 belonging to BSS_2 which is another wireless network. Then, as a method of transmitting a frame to communication device 100 and/or peripheral device 200 belonging to another BSS, a broadcast address can be designated as both of the destination MAC address and the BSSID as shown in Case 10 in FIG. 6. In this case, regardless of the BSS, all communication devices (communication device 100_2 and peripheral devices 200_1 to 200_6) that can receive a frame from communication device 100_1 analyze and process contents in the frame from communication device 100_1.

By making designation as shown in Case 10 in FIG. 6, however, contents in a frame received by all communication devices within coverage of a sender communication device are analyzed and processed. Therefore, there is a concern about increase in processing load in an irrelevant communication device or generation of erroneous processing in the irrelevant communication device. Therefore, generation of a frame as shown in Case 10 in FIG. 6 is not realistic either.

A method of exchanging data through a router between communication devices 100 that operate as the APs in the Internet protocol (IP) layer higher than the wireless network is also possible. There may be no router, however, that connects communication devices 100 that operate as the APs to each other. In addition, by communication through a router or the like, the number of transfer hops may increase and efficiency in transmission of data and a data transmission rate may lower.

In order to address such a new problem, communication system 1 according to the present embodiment provides a communication method and the like allowing, even though there are a plurality of wireless networks (BSSs) configured in the infrastructure mode, efficient and flexible exchange of data across the plurality of BSSs.

More specifically, in communication system 1 according to the present embodiment, a new scheme allowing designation of an arbitrary BSSID (though a MAC address of a communication device that operates as the AP is generally used, limitation thereto is not intended) separate from a BSSID used under the IEEE 802.11 standards is introduced. In the description below, a BSSID having an arbitrary value different from a BSSID used under the IEEE 802.11 standards is also referred to as a "virtual BSSID" or a "VBSSID". The virtual BSSID is an exemplary identification value for virtually configuring a BSS. An arbitrary value that does not overlap or collide with an arbitrary MAC address and a broadcast address can be used as the virtual BSSID. A value completely different from all possible MAC addresses does not have to be selected as the virtual BSSID, and overlapping or collision with a MAC address should only realistically be avoided.

A wireless network configured by using a virtual BSSID is also referred to as a "virtual BSS." "BSS_3" shown in FIG. 2 described above and "BSS_4" shown in FIG. 3 are exemplary virtual BSSs configured by using the virtual BSSID.

An exemplary wireless network (virtual BSS) virtually configured by using a virtual BSSID will now be described.

FIG. 7 shows an example in which a specific communication device in communication system 1 shown in FIG. 1 has a virtual BSSID 50. In communication system 1 shown in FIG. 7, communication device 100_1 and communication device 100_2 that operate as the APs and peripheral device 200_3 that operates as the STA are assumed as being in common in virtual BSSID 50.

Communication device 100_1, communication device 100_2, and peripheral device 200_3 process a frame including virtual BSSID 50 in IEEE 802.11 header 26, regarding the frame as being directed to the virtual wireless network to which these devices belong.

Exemplary frame transmission in communication system 1 shown in FIG. 7 will be described with reference to FIG. 8. FIG. 8 shows an example in which communication device 100_1 transmits a frame in communication system 1 shown in FIG. 7. The check mark in FIG. 8 means analysis and processing of contents in the frame from communication device 100_1 as in FIG. 6. It is assumed that communication devices 100_1 and 100_2 and peripheral devices 200_1 to 200_6 are present at positions proximate to one another and each communication device is able to receive a frame from other communication devices.

Since Case 1, Case 2, Case 4, Case 5, Case 7, Case 8, Case 10, Case 11, Case 13, and Case 14 in FIG. 8 are similar to Case 1, Case 2, Case 3, Case 4, Case 5, Case 6, Case 7, Case 8, Case 9, and Case 10 in FIG. 6, respectively, detailed description will not be repeated.

In Case 3 in FIG. 8, peripheral device 200_1 does not have virtual BSSID 50. Therefore, peripheral device 200_1 determines the frame as not being directed thereto and discards the received frame without analyzing contents therein. Similarly also in Case 6 in FIG. 8, peripheral device 200_2 does not have virtual BSSID 50. Therefore, peripheral device 200_2 determines the frame as not being directed thereto and discards the received frame without analyzing contents therein.

In contrast, in Case 9 in FIG. 8, peripheral device 200_3 has virtual BSSID 50. Therefore, peripheral device 200_3 determines the frame as being directed thereto and analyzes and processes contents in the frame from communication device 100_1. Similarly also in Case 12 in FIG. 8, communication device 100_2 has virtual BSSID 50. Therefore, communication device 100_2 determines the frame as being directed thereto and analyzes and processes contents in the frame from communication device 100_1.

In Case 15 in FIG. 8, only peripheral device 200_3 and communication device 100_2 having virtual BSSID 50 analyze and process contents in the frame from communication device 100_1.

As shown in FIG. 8, peripheral device 200_3 having virtual BSSID 50 performs reception processing of a frame in which virtual BSSID 50 has been designated as the BSSID, as a valid frame, in addition to the frame in which the BSSID (the MAC address of communication device 100_1) of the BSS to which the peripheral device belongs has been designated as the BSSID.

Similarly, communication device 100_2 having virtual BSSID 50 performs reception processing of a frame in which virtual BSSID 50 has been designated as the BSSID, as a valid frame, in addition to the frame in which the BSSID (the MAC address of communication device 100_2) of the BSS to which the communication device belongs has been designated as the BSSID.

"Performing reception processing of . . . as a valid frame" herein means not discarding a frame based on the designated BSSID. In other words, when the destination MAC address designated in the received frame satisfies a prescribed condition, contents in the frame may be analyzed.

By thus adopting a wireless network (virtual BSS) virtually configured with the use of virtual BSSID 50, such a situation that processing load increases in a communication device not belonging to the virtual BSS can be avoided and occurrence of erroneous processing in the communication device not belonging to the virtual BSS can also be avoided.

Though an example in which only a single wireless network (virtual BSS) virtually configured with the use of a virtual BSSID is provided is shown for the sake of convenience of description, the number of configured virtual BSSs is not restricted. Each communication device can not only belong to one specific virtual BSS but also simultaneously belong to a plurality of virtual BSSs. In this case, each communication device has virtual BSSIDs as many as virtual BSSs to which it belongs.

In other words, though an example in which a communication device that operates as an AP and/or an STA has one virtual BSSID is shown for the sake of convenience of description, the number of virtual BSSIDs held in each communication device is not restricted.

Since the virtual BSS is configured independently of the BSS, it may be configured across a plurality of BSSs or only some of communication devices belonging to a single BSS may configure a virtual BSS. Furthermore, a communication device belonging to no BSS can belong to a virtual BSS.

Technical significance of "belonging to a virtual BSS" in communication system 1 according to the present embodiment will be described.

The substance of a virtual BSS in communication system 1 according to the present embodiment may not be present. In other words, a procedure of connection between an AP and an STA as in the BSS in conformity with the IEEE 802.11 standards is not required in the virtual BSS. At least recognition by a communication device belonging to any virtual BSS that it belongs to that virtual BSS will suffice. Alternatively, recognition by a communication device that will belong to any virtual BSS, of that virtual BSS to which it will belong will suffice.

More specifically, each communication device should only be able to specify a virtual BSSID that specifies a virtual BSS to which the communication device belongs. Any method can be adopted as a scheme for allowing a communication device to specify a virtual BSSID.

For example, one virtual BSSID or a plurality of virtual BSSIDs can be included in an application program or a system program executed in a communication device or in data held in the communication device.

Alternatively, a communication device may use arbitrary communication means to communicate with another communication device to exchange a virtual BSSID. A broadcast address or an already known virtual BSSID can be employed as arbitrary communication means. The communication device may obtain through the Internet, a virtual BSSID for specifying a virtual BSS in which the communication device should participate.

Further alternatively, a user who operates a communication device may set a value of an arbitrary virtual BSSID or a value for generating a virtual BSSID.

In the BSS under the IEEE 802.11 standards, the AP manages a configuration, change, or release of the BSS. In the virtual BSS, however, management by the AP is not required. Consequently, in the virtual BSS, a management function as in the AP is not necessarily required, and a clear difference in role between the AP and the STA is not necessarily required either. For example, in the BSS under the IEEE 802.11 standards, distribution of advertisement information with a beacon or the like is not necessarily required either, and hence the virtual BSS can also be configured only with a communication device that operates as the STA.

[D. Method of Determining Virtual BSSID]

Any value that does not overlap or collide with a BSSID (that is, a MAC address of a communication device that operates as the AP) under the IEEE 802.11 standards may be employed as a virtual BSSID to be used in communication system 1 according to the present embodiment.

The virtual BSSID may be stored in advance in communication devices that configure the virtual BSS or may be generated with an arbitrary method. For example, a method below is possible.

(1-1) When a corporation involved with production of communication devices has an organizationally unique identifier (OUI: a vendor code) allocated to a product vendor (network equipment manufacturer), one MAC address or a plurality of MAC addresses from an OUI range can be used as virtual BSSID(s).

(1-2) A MAC address of a communication device held by a developer of an application program executed in a communication device can be used as a virtual BSSID. In other words, a MAC address guaranteed not to be distributed in markets may be used as the virtual BSSID.

(2-1) A virtual BSSID can be generated from a MAC address of an arbitrary communication device which will belong to a virtual BSS. A MAC address of a communication device that operates as the STA would not be used as the BSSID, and therefore it can be used as it is as the virtual BSSID.

A virtual BSSID may be generated from a MAC address of a communication device that operates as the AP, by changing a value of a specific bit in the MAC address of the communication device. For example, by setting a local bit included in the MAC address to "1" (which is normally set to "0"), the MAC address can be used as the virtual BSSID. The local bit corresponds to a GL bit included in a top octet of the MAC address.

When a virtual BSSID is generated by using a local bit, an identical virtual BSSID may be present nearby. Therefore, collision sensing may be carried out. In the event of sensing of collision, such processing as temporary suspension of use of the virtual BSSID and change of the virtual BSSID to a new virtual BSSID under common rules by each communication device may be adopted.

(2-2) A virtual BSSID can be generated by using a hash calculated from a user identifier, an application identifier, or a password.

In (1-1) and (1-2) described above, a form of incorporation of a virtual BSSID statically determined in advance in a communication device is assumed, and in (2-1) and (2-2) described above, a form of dynamic generation of a virtual BSSID as necessary while a communication device is operating is assumed.

[E. Exemplary Implementation Involved with Configuration of Virtual BSS]

An exemplary implementation for configuring a virtual BSS in communication system 1 according to the present embodiment will now be described with reference to FIG. 9.

Figure 9:
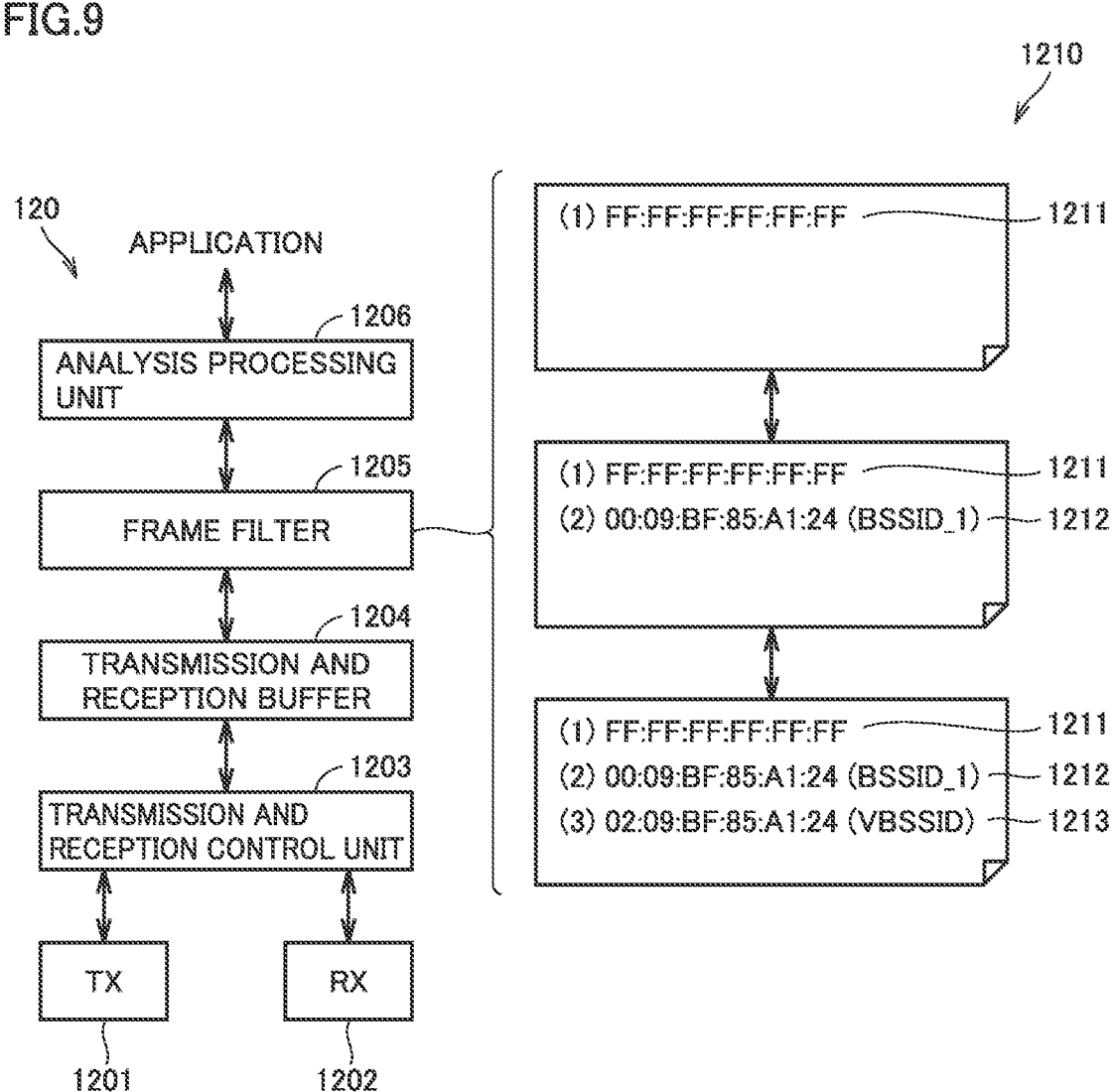
FIG. 9 shows an exemplary illustrative non-limiting drawing illustrating an exemplary implementation for configuring a virtual BSS in the communication system according to the present embodiment.

FIG. 9 shows a main part of wireless communication unit 120 of communication device 100. Similar implementation can be adopted also in peripheral device 200.

Referring to FIG. 9, wireless communication unit 120 includes a transmission circuit 1201, a reception circuit 1202, a transmission and reception control unit 1203, a transmission and reception buffer 1204, a frame filter 1205, and an analysis processing unit 1206.

Transmission circuit 1201 generates and transmits a wireless signal involved with data transmission in response to an instruction from transmission and reception control unit 1203. Reception circuit 1202 receives and decodes a wireless signal involved with data transmission in response to an instruction from transmission and reception control unit 1203. Transmission and reception control unit 1203 controls transmission and reception of a wireless signal to and from transmission circuit 1201 and reception circuit 1202.

Transmission and reception buffer 1204 temporarily stores data (frame) received via transmission and reception control unit 1203 and data (frame) transmitted via transmission and reception control unit 1203.

Frame filter 1205 refers to contents in IEEE 802.11 header 26 of a received frame stored in transmission and reception buffer 1204 and provides only a frame that satisfies a condition to analysis processing unit 1206. More specifically, (1) when a value designated in destination MAC address field 263 in IEEE 802.11 header 26 matches with the MAC address of the communication device or with the broadcast address and (2) when a value designated in BSSID field 265 in IEEE 802.11 header 26 matches with any value registered in a processing target list 1210, frame filter 1205 finds that frame as a frame to be processed and provides the frame to analysis processing unit 1206.

Analysis processing unit 1206 analyzes contents in the received frame and provides a result of analysis to an application.

Processing target list 1210 set in frame filter 1205 is implemented as a kind of a white list. In processing target list 1210, a MAC address for specifying a frame contents in which are to be analyzed is defined.

Normally, a frame in which a broadcast address has been designated as the BSSID should constantly be processed. Therefore, a broadcast address 1211 is always registered in processing target list 1210.

As a communication device belongs to any BSS, a BSSID 1212 for identifying the BSS is registered in processing target list 1210. A communication device that operates as the AP would register in processing target list 1210, as BSSID 1212, a MAC address of the communication device itself. A communication device that operates as the STA would register in processing target list 1210, as BSSID 1212, a MAC address of an AP to which it is connected.

Furthermore, in order to belong to a virtual BSS, the communication device registers a virtual BSSID value 1213 in processing target list 1210. Timing of registration of virtual BSSID value 1213 in processing target list 1210 may be determined as appropriate depending on an application.

Though FIG. 9 shows an example in which only a single virtual BSSID value 1213 is registered in processing target list 1210, a plurality of virtual BSSID values 1213 can also be registered in processing target list 1210. Some or all of virtual BSSID values 1213 may dynamically be added or deleted. Specific virtual BSSID value 1213 may always be registered, similarly to broadcast address 1211.

When an exemplary implementation as shown in FIG. 9 is adopted, at a time point of registration of virtual BSSID value 1213 in processing target list 1210, a communication device can also be regarded as belonging to the virtual BSS specified by registered virtual BSSID value 1213.

Each component of wireless communication unit 120 shown in FIG. 9 may be implemented by hardware and/or software included in wireless communication unit 120 or some of components may be implemented by execution of software by processor 102. For example, they may be implemented by firmware executed by wireless communication unit 120 or by a wireless driver executed by processor 102.

[F. Exemplary Application]

An exemplary application using a virtual BSS according to the present embodiment will now be described.

Figure 10:
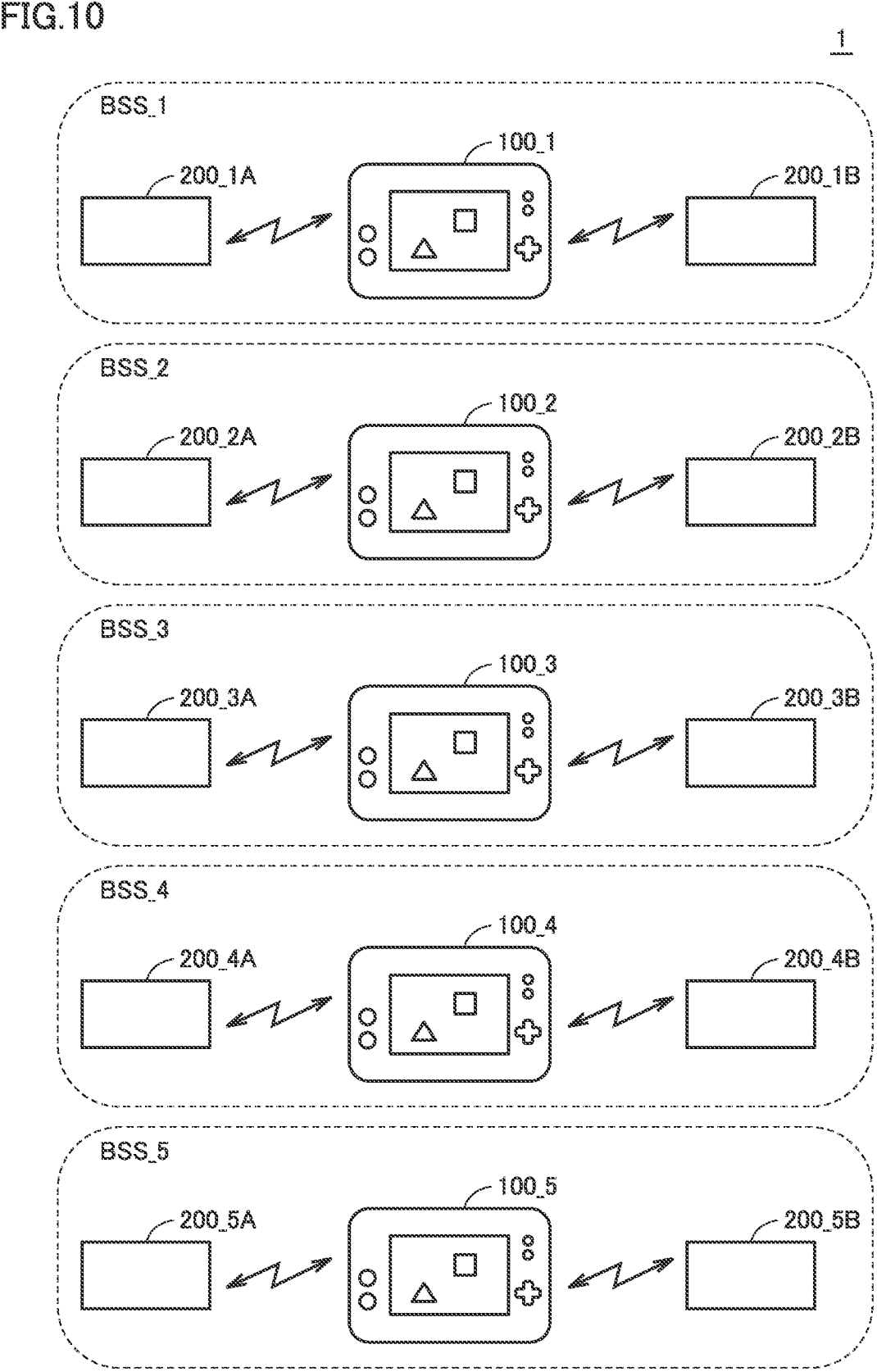
FIG. 10 shows an exemplary illustrative non-limiting drawing illustrating an operation in one aspect, by the communication system according to the present embodiment.

FIG. 10 shows an exemplary operation in one aspect, by communication system 1 according to the present embodiment. FIG. 10 shows an example in which each communication device 100 configures a BSS together with two peripheral devices 200. More specifically, communication device 100_1 configures a BSS having the BSSID "BSS_1" together with peripheral devices 200_1A and 200_1B. This is also applicable to each of communication devices 100_2 to 100_5.

Processing for configuring a virtual BSS between/among some or all of communication devices 100_1 to 100_5 and providing various applications (for example, game play by a plurality of users) in a state as shown in FIG. 10 will be described.

Figure 11:
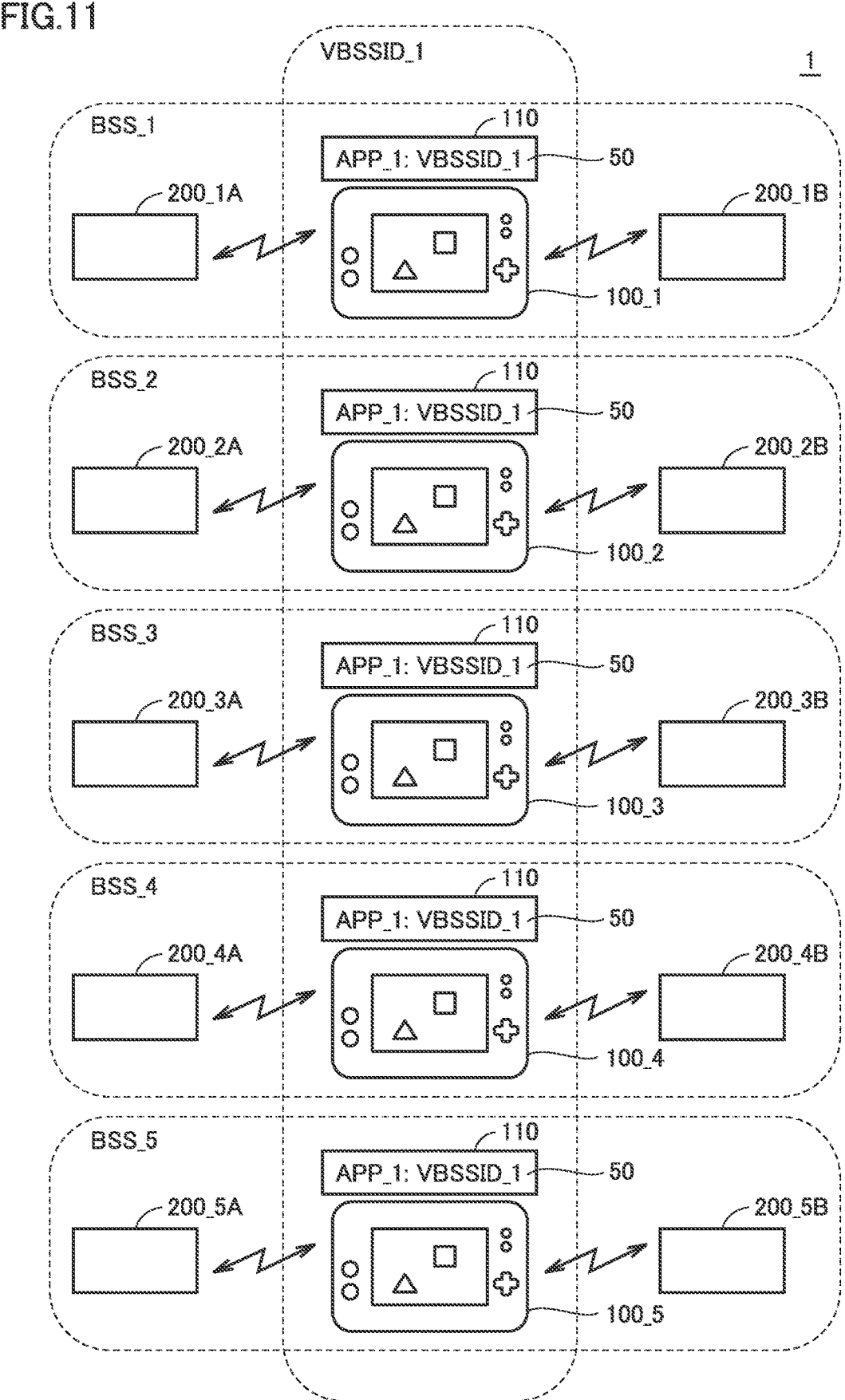
FIG. 11 shows an exemplary illustrative non-limiting drawing illustrating an exemplary virtual BSS configured among communication devices included in the communication system shown in FIG. 10.

FIG. 11 shows an exemplary virtual BSS configured among communication devices 100 included in communication system 1 shown in FIG. 10. Referring to FIG. 11, for example, each of communication devices 100_1 to 100_5 is assumed to be able to use identical application program 110.

Application program 110 includes virtual BSSID 50 for configuring a virtual BSS in addition to an execution code. In other words, virtual BSSID 50 may be included in application program 110. Communication devices 100 that execute identical application program 110 can thus substantially share virtual BSSID 50 included in application program 110.

The virtual BSS can thus be configured by using virtual BSSID 50 included in application program 110. A value that will not collide with a MAC address of another communication device is set for virtual BSSID 50.

FIG. 11 shows an example in which a virtual BSS having "VBSSID_1" as the virtual BSSID is configured among communication devices 100_1 to 100_5. VBSSID_1 shown in FIG. 11 can be implemented by validation by each of communication devices 100_1 to 100_5, of virtual BSSID 50 included in application program 110. For example, virtual BSSID 50 may be validated as a part of start-up processing as each of communication devices 100_1 to 100_5 starts up application program 110. Alternatively, a user who operates each of communication devices 100_1 to 100_5 may explicitly designate a configuration of the virtual BSS.

A frame in which virtual BSSID 50 included in application program 110 has been designated is discarded without analysis of contents therein in a communication device other than the communication device that executes application program 110. Therefore, influence on a communication device that executes another application program and a communication device other than the former that is present nearby can be lessened.

In VBSSID_1, in addition to information (for example, a user name or an icon) for selection by a user, of a player to play a game together, a new virtual BSSID is exchanged. When a player against which the game is played is determined by an operation by the user, use of the virtual BSS with the new virtual BSSID is started between communication devices operated by the determined users.

Figure 12:
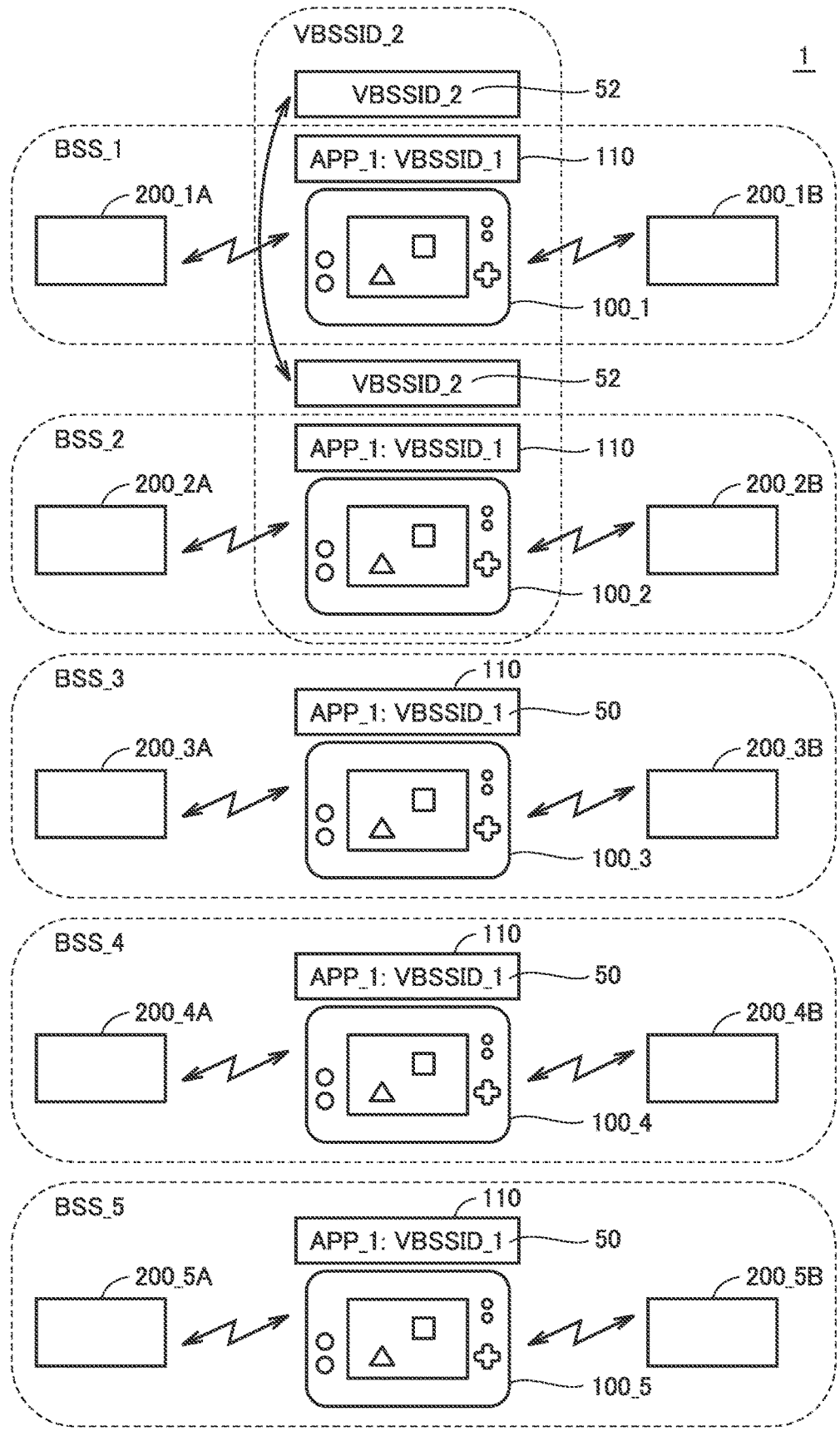
FIG. 12 shows an exemplary illustrative non-limiting drawing illustrating processing for exchanging a new virtual BSSID in the communication system shown in FIG. 11.

FIG. 12 shows exemplary processing for exchanging a new virtual BSSID in communication system 1 shown in FIG. 11. FIG. 12 shows exemplary processing in an example in which communication device 100_1 and communication device 100_2 configure a new virtual BSS. For example, communication device 100_1 generates a new virtual BSSID (which is also referred to as an "individual virtual BSSID 52" below for distinction from virtual BSSID 50) and exchanges generated individual virtual BSSID 52 with communication device 100_2. Individual virtual BSSID 52 can thus be shared between communication device 100_1 and communication device 100_2, and consequently, a virtual BSS identified as "VBSSID_2" indicated by individual virtual BSSID 52 between communication device 100_1 and communication device 100_2 is configured.

In communication system 1 shown in FIG. 11, virtual BSSID 50 and individual virtual BSSID 52 are set to a value different from at least any of the MAC addresses of communication devices 100_1 to 100_5 and the broadcast address (FF:FF:FF:FF:FF:FF).

A plurality of individual virtual BSSIDs 52 may be prepared so long as they have values different from one another. Typically, the individual virtual BSSID may be generated each time for each user group that plays a game. For an on-line match game in which a player plays against another player, different individual virtual BSSID 52 may be allocated for each pair of communication devices 100.

In the virtual BSS configured with the use of individual virtual BSSID 52, information necessary for execution of a game is exchanged. A frame in which individual virtual BSSID 52 has been designated is discarded without analysis of contents therein in a communication device other than the communication devices of the users who play the game together. Therefore, even when another user group that plays the same kind of game is present, mutual influence can be lessened.

Figure 13B:
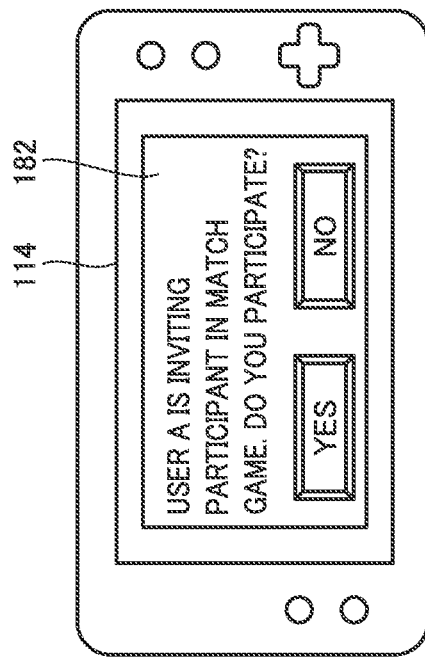
FIGS. 13A to 13D show exemplary illustrative non-limiting drawings illustrating an exemplary user interface provided in the communication system according to the present embodiment.
Figure 13D:
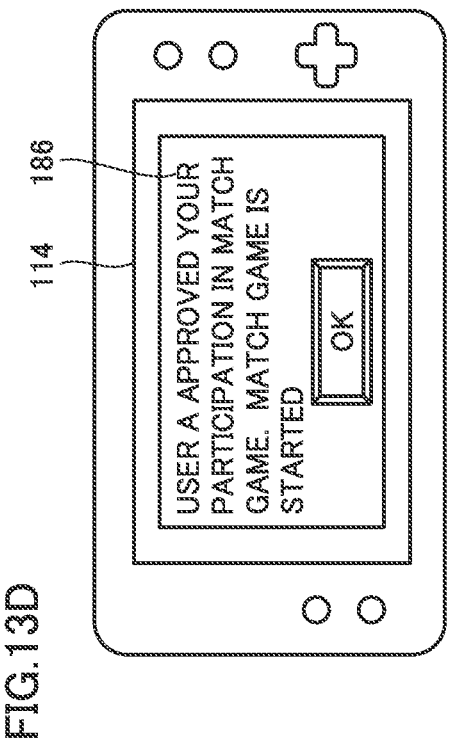
Figure 13A:
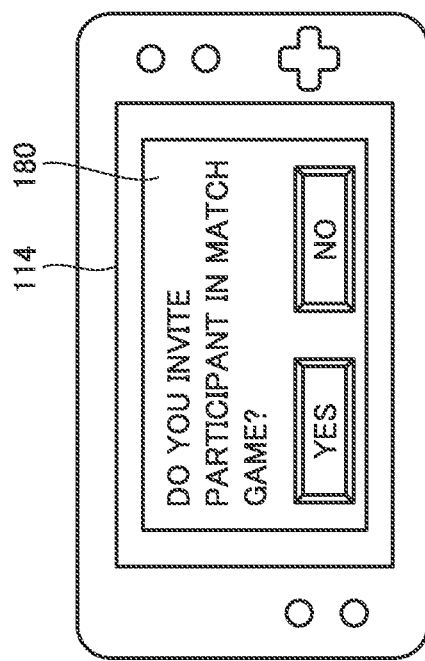
Figure 13C:
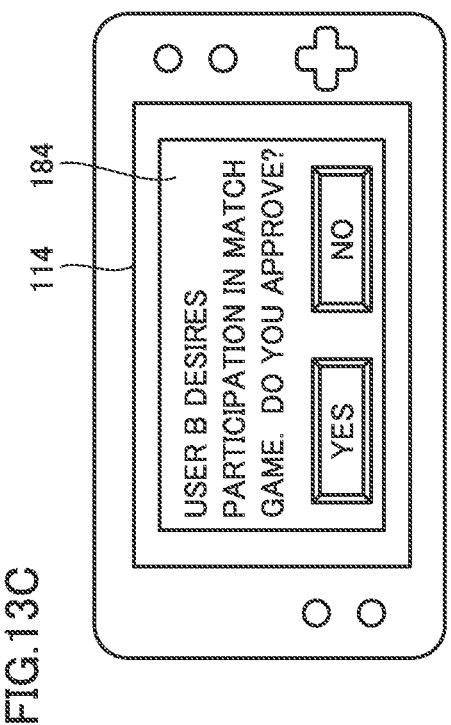

FIGS. 13A to 13D show an exemplary user interface provided in communication system 1 according to the present embodiment. FIGS. 13A to 13D show an example in which communication device 100_1 takes the lead to invite a user who will play together. More specifically, FIGS. 13A and 13C show exemplary contents of representation on display 114 of communication device 100_1 and FIGS. 13B and 13D show exemplary contents of representation on display 114 of communication device 100_2.

As shown in FIG. 13A, in response to an explicit or implicit instruction from a user, communication device 100_1 provides a message 180 "Do you invite participant in match game?" In response to selection of "YES" by a user, communication device 100_1 transmits an invitation notification in a frame in which virtual BSSID 50 included in application program 110 that provides the game has been designated. By designating virtual BSSID 50, the virtual BSS using virtual BSSID 50 as shown in FIG. 11 is configured. At this time, communication device 100_1 newly generates individual virtual BSSID 52 for a game to which a participant is invited and includes the individual virtual BSSID in the invitation notification.

In the virtual BSS using virtual BSSID 50, necessary information is exchanged between communication device 100_1 and another communication device. By obtaining such information exchange, communication device 100_2 provides a message 182 "User A is inviting participant in match game. Do you participate?" as shown in FIG. 13B. In response to selection of "YES" by a user, a participation request indicating a user's intention of participation is transmitted from communication device 100_2 to communication device 100_1.

Then, communication device 100_1 provides a message 184 "User B desires participation in match game. Do you approve?" as shown in FIG. 13C. In response to selection of "YES" by the user, communication device 100_1 transmits an approval notification to the effect that it approves participation to communication device 100_2.

For example, communication device 100_2 provides a message 186 "User A approved your participation in match game. Match game is started." as shown in FIG. 13D. When the user presses "OK", communication device 100_1 and communication device 100_2 start exchange of data involved with the game in the virtual BSS using individual virtual BSSID 52.

By thus using the virtual BSS according to the present embodiment, an unidentified number of users can be invited to participate. Once a user who plays a game together is determined, exchange of data can substantially be restricted to exchange only with the communication device of that user, and hence influence on a communication device present nearby other than the communication device can be lessened.

Exemplary handling of a communication channel for implementing the virtual BSS as described above will now be described.

Figure 14A:
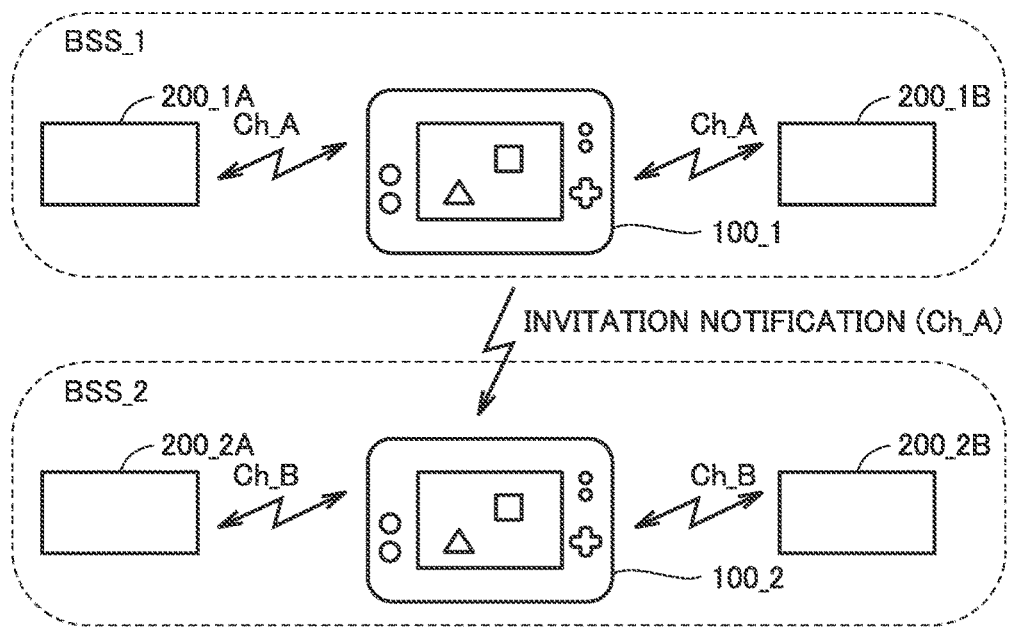
FIGS. 14A and 14B show exemplary illustrative non-limiting drawings illustrating handling of a communication channel in the communication system according to the present embodiment.
Figure 14B:
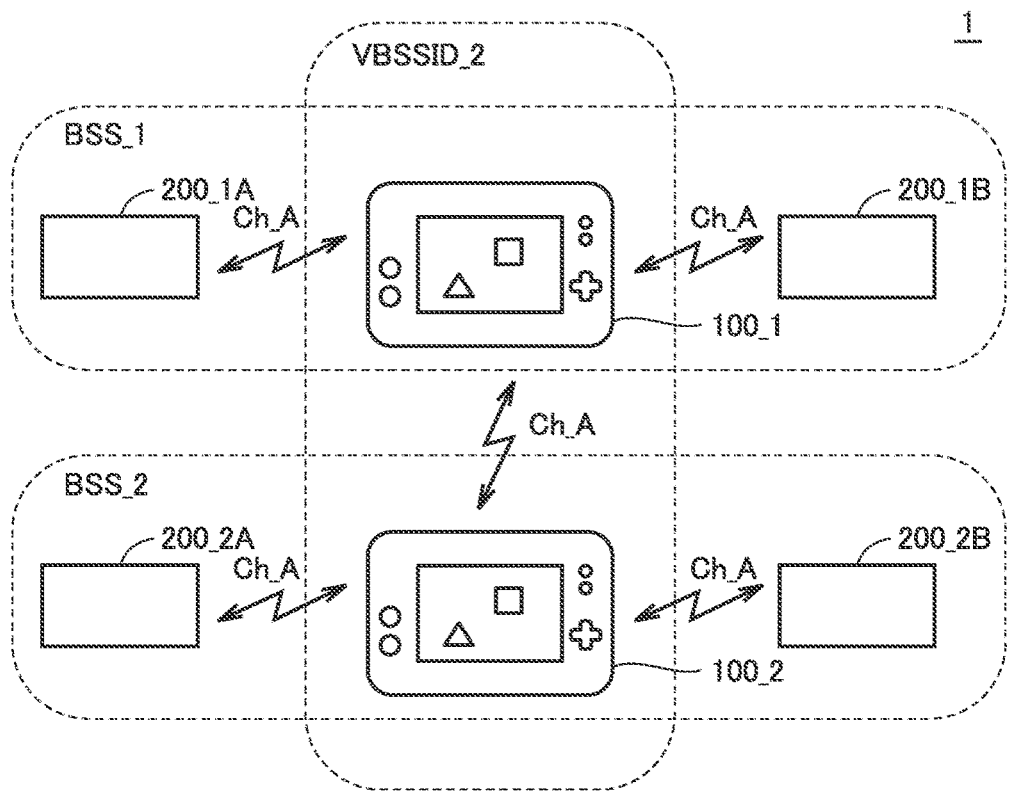

FIGS. 14A and 14B show exemplary handling of a communication channel in the communication system according to the present embodiment.

Under the IEEE 802.11 standards, a plurality of communication channels are available. For example, as shown in FIG. 14A, a communication channel Ch_A used in BSS_1 configured by communication device 100_1 with peripheral devices 200_1A and 200_1B is not necessarily identical to a communication channel Ch_B used in BSS_2 configured by communication device 100_2 with peripheral devices 200_2A and 200_2B.

Since with which communication device 100 communication device 100_1 will configure the virtual BSS is unknown, typically, communication device 100_1 may transmit an invitation notification through a communication channel (communication channel Ch_A in the example in FIGS. 14A and 14B) the same as the communication channel that it has been using for communication in the BSS. By using the communication channel the same as the communication channel used for communication in existing BSS_1, the invitation notification can be transmitted while communication over BSS_1 is stable.

Communication device 100_2 sequentially changes the communication channel and searches for the invitation notification. In other words, communication device 100_2 tries to receive the invitation notification by changing the communication channel as appropriate in fixed or random cycles. In the example in FIGS. 14A and 14B, communication device 100_2 receives the invitation notification through communication channel Ch_A. When communication device 100_1 and communication device 100_2 configure a virtual BSS (VBSSID_2) in response to the invitation notification, communication channel Ch_A used for transmission of the invitation notification may be used as it is.

When the communication channel used for communication over existing BSS_2 is different from the communication channel used for communication over the virtual BSS (VBSSID_2), the communication channel used for communication over existing BSS_2 is changed to match with the communication channel used for communication over the virtual BSS. In other words, communication device 100_2 communicates over existing BSS_2 through the communication channel used for transmission of the invitation notification.

In the example in FIGS. 14A and 14B, communication device 100_2 changes the communication channel to be used for communication over BSS_2 from communication channel Ch_B to communication channel Ch_A (see FIG. 14B). By such optimal selection and change of the communication channel, communication can be stable in any newly configured virtual BSS (VBSSID_2) in addition to existing BSS_1 and BSS_2.

Owing to handling of the communication channels as above, the identical communication channel is used in all of communication over BSS_1 by communication device 100_1, communication over BSS_2 by communication device 100_2, and communication between communication device 100_1 and communication device 100_2 (virtual BSS).

The communication channel for transmission of an invitation notification may be selected with any method. For example, an invitation notification may be transmitted through a predetermined fixed communication channel, or a degree of congestion of communication at the time point of transmission may be measured and a communication channel may be selected based on a result of measurement. Further alternatively, all communication devices 100 may cyclically sequentially change the communication channel to transmit and/or receive the invitation notification.

When a virtual BSS is configured in addition to the existing BSS by using the invitation notification, as shown in FIG. 14B, the existing BSS and the virtual BSS are once configured to use an identical communication channel as shown in FIG. 14B, and then switching to another communication channel at once may be made. For example, a degree of congestion of communication at a time point after configuration of the existing BSS and the virtual BSS may be measured, and a new communication channel may be selected based on a result of measurement. A communication channel different from the communication channel used for transmission of the invitation notification may thus be used to establish subsequent communication.

Figure 15:
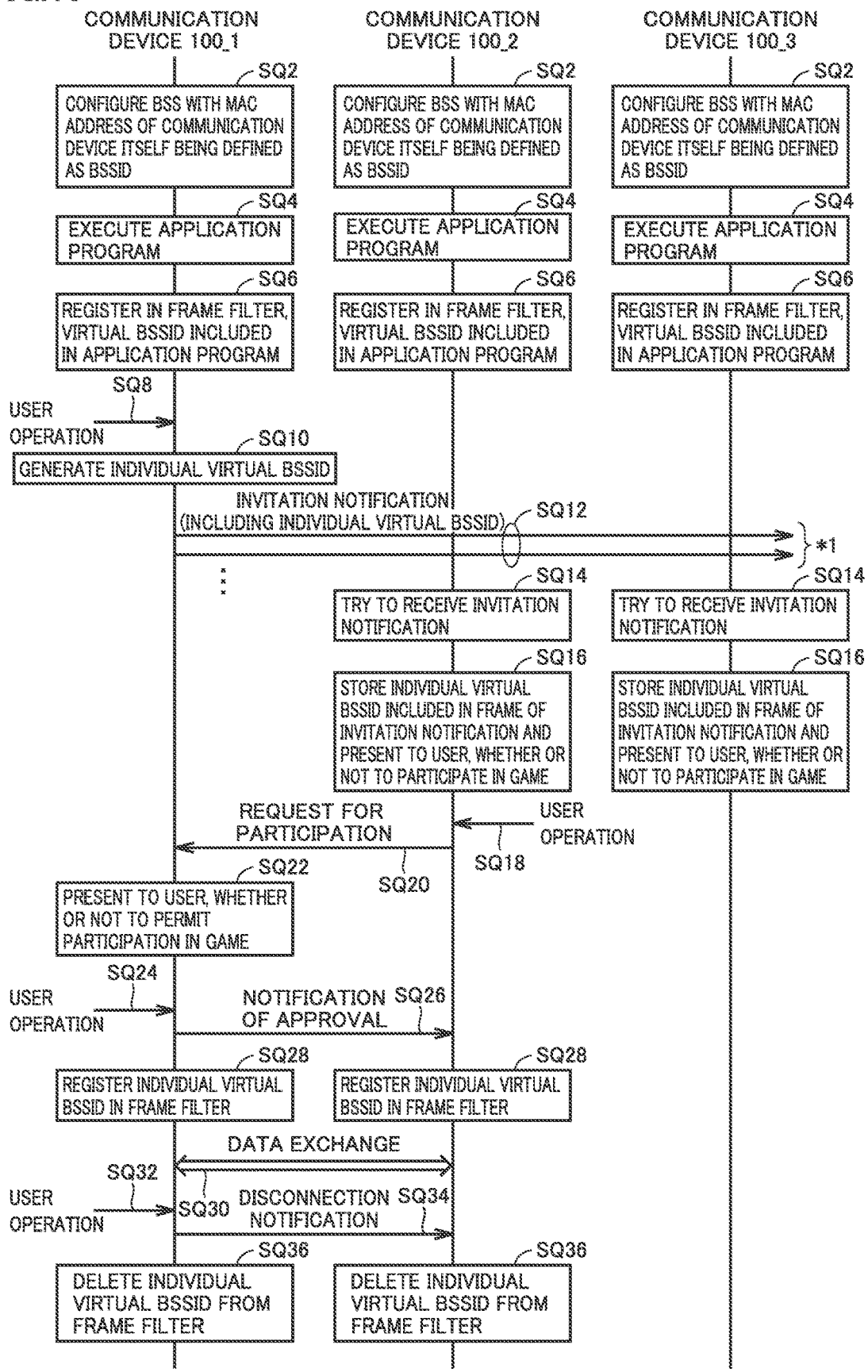
FIG. 15 shows an exemplary illustrative non-limiting drawing illustrating a sequence diagram for performing communication processing shown in FIGS. 10 to 12.

FIG. 15 shows a sequence diagram for performing communication processing shown in FIGS. 10 to 12. FIG. 15 shows a processing procedure in configuring a virtual BSS arising from communication device 100_1 by way of example. Processing performed by each communication device 100 shown in FIG. 15 is typically performed by execution of system program 108 (see FIG. 4 and the like) by processor 102 of each communication device 100 and processing provided by wireless communication unit 120.

Referring to FIG. 15, communication device 100_1 configures a BSS together with peripheral devices 200_1A and 200_1B, by using the MAC address of communication device 100_1 as the BSSID (sequence SQ2). Communication device 100_1 thus uses the BSSID thereof to configure a wireless network with another peripheral device 200 or a plurality of other peripheral devices 200.

Communication device 100_2 and communication device 100_3 also configure similar wireless networks (sequence SQ2). Specifically, each of communication device 100_2 and communication device 100_3 uses the BSSID thereof to configure a wireless network with another peripheral device 200 or a plurality of other peripheral devices 200.

Communication device 100_1 executes application program 110 (sequence SQ4). Then, communication device 100_1 registers virtual BSSID 50 included in application program 110 in frame filter 1205 (see FIG. 9) of wireless communication unit 120 (sequence SQ6). Communication device 100_1 is thus configured to perform reception processing of a frame in which virtual BSSID 50 has been designated as the BSSID, as a valid frame, in addition to the frame in which the BSSID (the MAC address of communication device 100_1) of the BSS to which the communication device belongs has been designated as the BSSID.

The reception processing is similarly configured also in communication device 100_2 and communication device 100_3 (sequences SQ4 and SQ6). Specifically, communication device 100_2 and communication device 100_3 are each configured to perform reception processing of a frame in which virtual BSSID 50 has been designated as the BSSID, as a valid frame, in addition to the frame in which the BSSID of the BSS to which the communication device itself belongs has been designated.

In succession, for example, when communication device 100_1 receives an operation by a user for game participation invitation (sequence SQ8) (see FIG. 13A and the like), it generates individual virtual BSSID 52 for that game (sequence SQ10). Individual virtual BSSID 52 may be generated, for example, by setting a local bit included in the MAC address of communication device 100_1 to "1".

Then, communication device 100_1 transmits an invitation notification including individual virtual BSSID 52 (sequence SQ12). The invitation notification is transmitted over the virtual BSS configured with virtual BSSID 50 included in application program 110. In other words, communication device 100_1 transmits a frame in which virtual BSSID 50 has been designated as the BSSID. At this time, communication device 100_1 transmits individual virtual BSSID 52 in the frame for the invitation notification.

More specifically, for the frame including the invitation notification, the broadcast address is designated as the destination MAC address, and virtual BSSID 50 is designated as the BSSID (see Case 15 in FIG. 8). A message indicating the invitation notification and individual virtual BSSID 52 are stored in data field 28 (see FIG. 5) in the frame. At this time, communication device 100_1 transmits the invitation notification through a communication channel the same as the channel used for communication over the BSS thereby.

Transmission of the invitation notification by communication device 100_1 may be repeated in fixed or random cycles (*1). Though the communication channel is basically fixed to an initially selected communication channel, the communication channel may be changed as appropriate.

Communication device 100_2 tries to receive the invitation notification (sequence SQ14). Reception of the invitation notification may be tried with the communication channel being changed as appropriate in fixed or random cycles. Since communication device 100_1 transmits the invitation notification through the communication channel used in the BSS configured with communication device 100_1, communication device 100_2 searches for the invitation notification by sequentially changing the communication channel. When communication device 100_2 receives the frame of the invitation notification, it stores individual virtual BSSID 52 included in the frame of the invitation notification, and presents to the user, whether or not to participate in the game to which it has been invited by communication device 100_1 (sequence SQ16).

Processing similar to processing in communication device 100_2 is performed also in communication device 100_3.

When communication device 100_2 receives an operation by a user who desires participation in the game (sequence SQ18) (see FIG. 13B or the like), it transmits a participation request to communication device 100_1 (sequence SQ20). The participation request is also transmitted over the virtual BSS configured using virtual BSSID 50 included in application program 110.

Individual virtual BSSID 52 included in the frame of the invitation notification may be stored on condition that an operation by a user who desires to participate in the game is received.

When communication device 100_1 receives the participation request from communication device 100_2, it presents whether or not to permit participation in the game to the user (sequence SQ22). When communication device 100_1 receives the operation by the user to approve participation in the game (sequence SQ24) (see FIG. 13C or the like), it transmits an approval notification to communication device 100_2 (sequence SQ26). The approval notification is also transmitted over the virtual BSS configured using virtual BSSID 50 included in application program 110.

Through the processing procedure above, preparation for configuring the virtual BSS involved with a game of interest is made. Then, communication device 100_1 and communication device 100_2 each register individual virtual BSSID 52 in frame filter 1205 (see FIG. 9) of wireless communication unit 120 (sequence SQ28). When the communication channel used in the BSS configured by communication device 100_2 is different from the communication channel used in the virtual BSS, communication device 100_2 may change the communication channel used in the BSS configured by communication device 100_2 to the communication channel to be used in the virtual BSS.

In succession, communication device 100_1 and communication device 100_2 start exchange of data involved with the game by using the virtual BSS configured using individual virtual BSSID 52 (sequence SQ30). Communication device 100_1 and communication device 100_2 transmit and receive frames involved with exchange of data through the communication channel where the frame of the invitation notification was transmitted.

For the frame used for data exchange between communication device 100_1 and communication device 100_2, the MAC address of communication device 100_1 (in an example of a frame directed to communication device 100_1) or the MAC address of communication device 100_2 (in an example of a frame directed to communication device 100_2) is designated as the destination MAC address, and individual virtual BSSID 52 is designated as the BSSID (see Case 9 and Case 12 in FIG. 8). Data involved with the game is stored in data field 28 (see FIG. 5) of the frame.

Thus, communication device 100_2 stores individual virtual BSSID 52, and thereafter communication device 100_1 and communication device 100_2 exchange data involved with the game in a frame in which individual virtual BSSID 52 has been designated as the BSSID.

Thereafter, when communication device 100_1 receives an operation by the user for quitting the game (sequence SQ32), it transmits a disconnection notification to communication device 100_2 (sequence SQ34). Then, communication device 100_1 and communication device 100_2 each delete individual virtual BSSID 52 from frame filter 1205 (see FIG. 9) of wireless communication unit 120 (sequence SQ36). The virtual BSS configured with individual virtual BSSID 52 is thus substantially released.

Though an example in which a single communication device 100 transmits an invitation notification is shown for the sake of convenience of description, a plurality of communication devices 100 may also transmit invitation notifications. In such a case, the user may select in which he/she desires to participate.

Figures 16A, 16B:
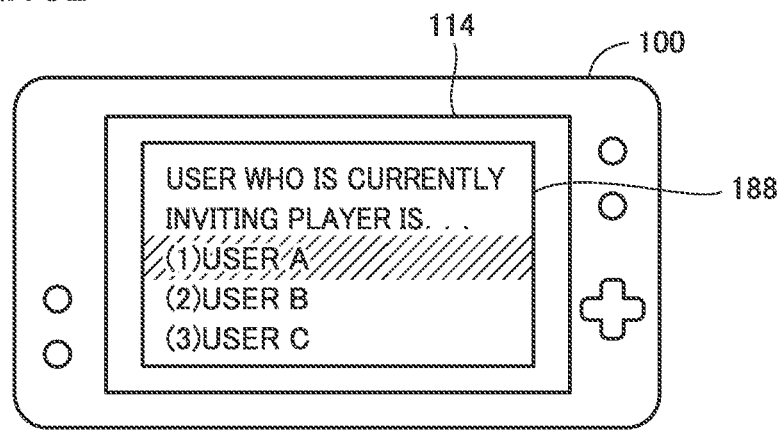
FIGS. 16A and 16B show exemplary illustrative non-limiting drawings illustrating processing in the communication device that receives an invitation notification in the communication system according to the present embodiment.

Processing in communication device 100 that receives an invitation notification in communication system 1 according to the present embodiment will be described with reference to FIGS. 16A and 16B. As shown in FIG. 16A, when arbitrary communication device 100 receives a plurality of invitation notifications, it sequentially stores the virtual BSSID and the channel included in the received invitation notification in correspondence with each other. Communication device 100 may also store in association, attribute information (for example, a name of a user who has transmitted the invitation notification) relating to the received invitation notification.

By collecting thus received invitation notifications, communication device 100 can provide an invitation notification list representation 188 as shown in FIG. 16B. Invitation notification list representation 188 shows invitation notifications from other communication devices 100 that are present nearby. When the user selects one the user desires in invitation notification list representation 188, communication device 100 starts exchange of data over the virtual BSS with communication device 100 corresponding to the selected invitation notification.

An example in which communication device 100 that transmits the invitation notification uses only a specific communication channel is shown in the processing procedure shown in FIG. 15. Without being limited as such, communication device 100 may cyclically sequentially change the communication channel to transmit the invitation notification. In this case, communication device 100 that receives the invitation notification may search for the invitation notification by fixing the communication channel to a specific communication channel or by randomly sequentially changing the communication channel.

Since the AP (parent) and the STA (child) do not have to clearly be distinguished from each other in the virtual BSS configured in communication system 1 according to the present embodiment, communication device 100 that generates individual virtual BSSID 52 may not uniquely be determined. Therefore, individual virtual BSSID 52 may be determined among communication devices 100 that configure the virtual BSS under predetermined rules. For example, individual virtual BSSID 52 may be generated from a newest MAC address or an oldest MAC address among communication devices 100 that configure an arbitrary virtual BSS.

In communication system 1 according to the present embodiment as described above, an invitation notification, a participation request, and an approval notification are exchanged over the virtual BSS configured using virtual BSSID 50 included in application program 110, and data involved with a game is exchanged among communication devices 100 matched in a series of exchanges over the virtual BSS configured using individual virtual BSSID 52 different from virtual BSSID 50 included in application program 110. By adopting such a two-stage virtual BSS, more communication devices 100 can be invited to participate in a game, and once the game is determined to be played together, influence on other communication devices 100 can be lessened.

[G. Functional Configuration of Communication Device 100]

A main functional configuration implemented in communication device 100 included in communication system 1 according to the present embodiment will now be described.

Figure 17:
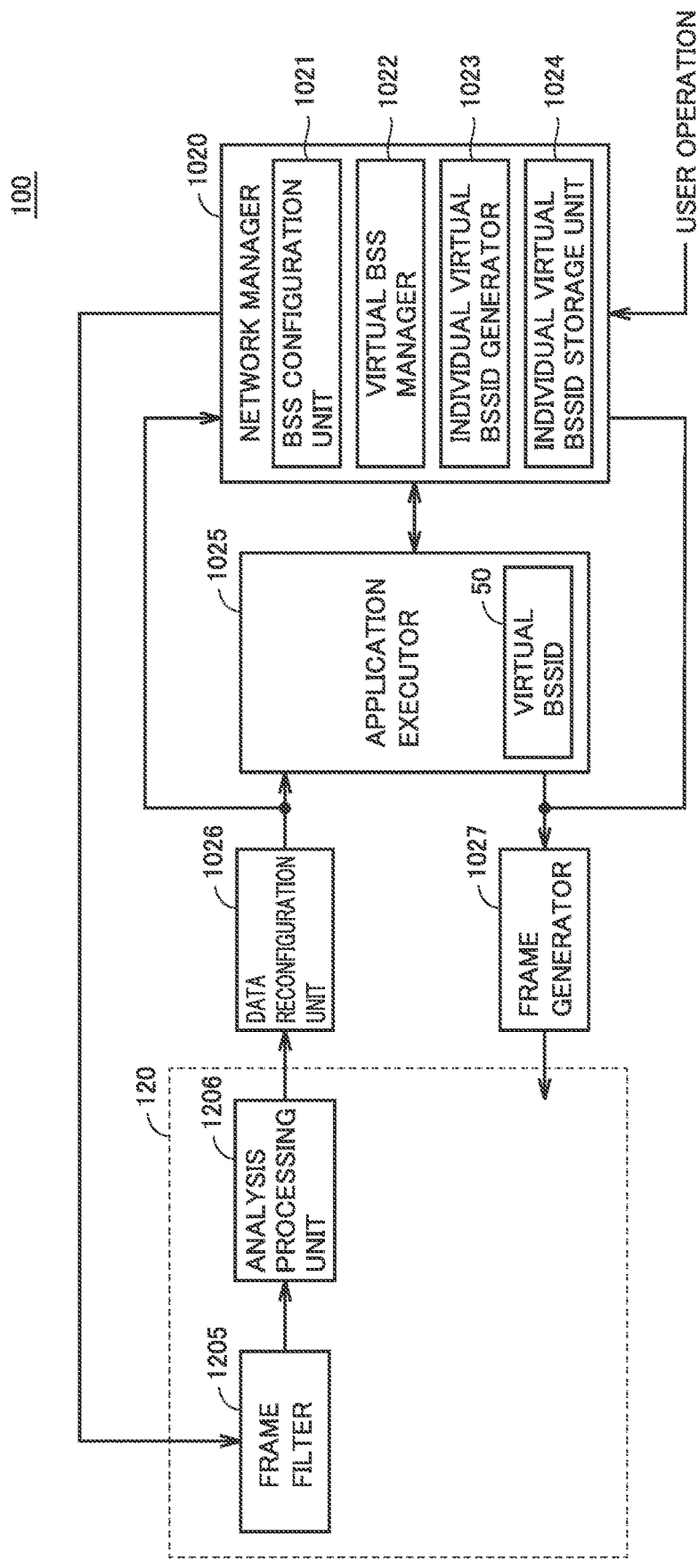
FIG. 17 shows an exemplary illustrative non-limiting drawing illustrating an exemplary functional configuration implemented in the communication device included in the communication system according to the present embodiment.

FIG. 17 shows an exemplary functional configuration implemented in communication device 100 included in communication system 1 according to the present embodiment. Each functional module shown in FIG. 17 is typically implemented by execution of system program 108 (see FIG. 4 and the like) by processor 102 of each communication device 100 and processing provided by wireless communication unit 120.

Referring to FIG. 17, communication device 100 includes a network management module 1020, an application execution module 1025, a data reconfiguration module 1026, and a frame generation module 1027.

Network management module 1020 is responsible for processing for configuration of a wireless network by communication device 100 with peripheral device 200 and/or another communication device 100 in response to an operation by a user and/or a request from application execution module 1025. More specifically, network management module 1020 includes a BSS configuration module 1021, a virtual BSS management module 1022, an individual virtual BSSID generation module 1023, and an individual virtual BSSID storage module 1024.

BSS configuration module 1021 determines as which of the AP and the STA communication device 100 operates in the infrastructure mode and performs a processing sequence necessary for configuring the BSS. Typically, BSS configuration module 1021 configures the BSS which is the wireless network with another peripheral device 200 or a plurality of other peripheral devices 200 by using the MAC address of the communication device itself as the BSSID. BSS configuration module 1021 registers in frame filter 1205 of wireless communication unit 120, the BSSID for specifying the BSS configured with communication device 100.

Virtual BSS management module 1022 manages the configuration of the virtual BSS using the virtual BSSID shared or exchanged with another communication device 100. Typically, virtual BSS management module 1022 has virtual BSSID 50 in common to another communication device 100 or a plurality of other communication devices 100 stored. Virtual BSS management module 1022 registers or deletes virtual BSSID 50 and/or individual virtual BSSID 52 in or from frame filter 1205 of wireless communication unit 120. By registering virtual BSSID 50 in frame filter 1205, reception processing of a frame in which virtual BSSID 50 has been designated as the BSSID, as a valid frame, in addition to a frame in which the BSSID of the BSS to which the communication device itself belongs has been designated as the BSSID, is performed.

Individual virtual BSSID generation module 1023 generates individual virtual BSSID 52 as necessary.

Individual virtual BSSID storage module 1024 stores individual virtual BSSID 52 obtained from another communication device 100.

Application execution module 1025 is an engine that executes application program 110. Application execution module 1025 holds virtual BSSID 50 included in application program 110.

Data reconfiguration module 1026 reconfigures transmitted data from one frame or a plurality of frames received from wireless communication unit 120 (analysis processing module 1206). Data reconfiguration module 1026 provides the reconfigured data to network management module 1020 and/or application execution module 1025.

Frame generation module 1027 generates one frame or a plurality of frames including data provided from network management module 1020 and/or application execution module 1025. Typically, frame generation module 1027 generates a frame in which virtual BSSID 50 and/or individual virtual BSSID 52 have/has been designated as the BSSID. Wireless communication unit 120 transmits the frame generated by frame generation module 1027.

[H. Other Forms]

Though exemplary processing for virtually configuring a wireless network by using virtual BSSID 50 and/or individual virtual BSSID 52 between two communication devices is described for the sake of convenience of description, a wireless network can also naturally virtually be configured among a larger number of communication devices.

An exemplary implementation in which communication device 100 alone performs necessary processing is shown in the description above. Without being limited as such, the entirety or a part of necessary processing may be performed by using a computing resource (typically, a computing resource on the cloud) different from communication device 100. An appropriate form of performing processing should only be adopted depending on times.

[I. Advantages]

According to the communication system in the present embodiment, data can efficiently and flexibly be exchanged among a plurality of communication devices belonging to different wireless networks (BSSs) by configuring a virtual wireless network by using virtual BSSID 50 and/or individual virtual BSSID 52.

For example, by designating a virtual BSSID as the BSSID and designating a broadcast address as the destination MAC address, data can collectively be transmitted as in IP multicast to a plurality of communication devices that share the virtual BSSID. Though a transmission destination is limited to communication devices within coverage of a sender communication device, a repeater such as a router is not required, and a frame is directly transmitted from a sender communication device to a reception-side communication device. Therefore, high efficiency in transmission of data can be maintained.

By designating the virtual BSSID as the BSSID, even when a broadcast address is designated as the destination MAC address, that frame is subjected to reception processing only by a communication device in which the virtual BSSID has been registered in the frame filter, and a communication device other than that (including a device that does not support the scheme for the virtual BSSID according to the present embodiment) discards the frame without analyzing contents therein. Therefore, increase in processing load in an irrelevant communication device that is present nearby or occurrence of erroneous processing in the irrelevant communication device as in designation of the broadcast address as the BSSID can be prevented.

The virtual wireless network configured with the virtual BSSID according to the present embodiment can be implemented simply by implementing the frame filter that allows selective reception of a frame in which the virtual BSSID and/or the individual virtual BSSID held in common to another communication device have/has been designated. Since such a frame filter can relatively easily be implemented and each BSSID is composed only of six bytes, consumption of a computing resource is only a little.

Furthermore, implementation with the use of the frame filter allows easy increase in number of virtual wireless networks to which a device can simultaneously belong. Therefore, various types of information or games using data exchanged among a plurality of wireless networks can be provided to a user.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A communication system comprising:
   a first communication device controllable to configure a first wireless network together with another peripheral device or a plurality of other peripheral devices by using a first basic service set identifier (BSSID); and
   a second communication device controllable to configure a second wireless network together with another peripheral device or a plurality of other peripheral devices by using a second BSSID, wherein:
   the first BSSID is identical to a media access control (MAC) address of the first communication device, the second BSSID is identical to a MAC address of the second communication device, the first communication device and the second communication device are common in a first identification value, the first communication device is configured to:
transmit a first frame in which the first identification value has been designated as a BSSID, and
perform reception processing of a frame in which the first identification value has been designated as the BSSID, as a valid frame, in addition to a frame in which the first BSSID has been designated as the BSSID, the second communication device is configured to perform reception processing of the frame in which the first identification value has been designated as the BSSID, as the valid frame, in addition to a frame in which the second BSSID has been designated as the BSSID, the first communication device is further configured to transmit a second identification value different from the first identification value by using the first frame, and the second communication device is further configured to receive the first frame and to store the second identification value included in the first frame.

2. The communication system according to claim 1, wherein the second communication device is configured to store the second identification value included in the first frame in response to an operation by a user.

3. The communication system according to claim 1, wherein the first communication device and the second communication device are configured to exchange data in a second frame in which the second identification value has been designated as the BSSID, after the second communication device stores the second identification value.

4. The communication system according to claim 3, wherein:
a broadcast address is designated as a destination MAC address in the first frame, and
the MAC address of the first communication device or the second communication device is designated as the destination MAC address in the second frame.

5. The communication system according to claim 3, wherein:
the first communication device is configured to transmit the first frame through a communication channel identical to a communication channel used for communication over the first wireless network, and
the second communication device is configured to search for the first frame by sequentially changing the communication channel.

6. The communication system according to claim 5, wherein the second communication device is configured to communicate over the second wireless network through the communication channel used for transmission of the first frame.

7. The communication system according to claim 1, wherein:
the first communication device and the second communication device are configured to execute an application program, and
the first identification value is included in the application program.

8. The communication system according to claim 1, wherein the second identification value is generated by changing a value of a specific bit in the MAC address of the first communication device.

9. The communication system according to claim 1, wherein the first identification value and the second identification value are set to a value different from all of the MAC address of the first communication device, the MAC address of the second communication device, and a broadcast address.

10. The communication system according to claim 1, wherein an identical communication channel is used in communication over the first wireless network, communication over the second wireless network, and communication between the first communication device and the second communication device.

11. A communication method for use with a first communication device comprising a transceiver, the method comprising:
configuring a first wireless network together with another peripheral device or a plurality of other peripheral devices by using a first basic service set identifier (BSSID), the first BSSID being identical to a media access control (MAC) address of the first communication device;
storing a first identification value in common to a second communication device that configures a second wireless network together with another peripheral device or a plurality of other peripheral devices by using a second BSSID, the second BSSID being identical to a MAC address of the second communication device;
performing reception processing of a frame in which the first identification value has been designated as a BSSID, as a valid frame, in addition to a frame in which the first BSSID has been designated as the BSSID; and
configuring the first communication device to perform reception processing of a frame in which a first identification value has been designated as a BSSID, as a valid frame, in addition to a frame in which the first BSSID has been designated as the BSSID;
configuring the second communication device to perform reception processing of the frame in which the first identification value has been designated as the BSSID, as the valid frame, in addition to a frame in which the second BSSID has been designated as the BSSID; and
transmitting a first frame in which the first identification value has been designated as the BSSID,
wherein a second identification value different from the first identification value is transmitted by using the first frame so that the second communication device is controlled to receive the first frame and to store the second identification value included in the first frame.

12. The communication method according to claim 11, wherein the first communication device and the second communication device are configured to exchange data in a second frame in which the second identification value has been designated as the BSSID, after the second communication device stores the second identification value.

13. The communication method according to claim 12, wherein:
a broadcast address is designated as a destination MAC address in the first frame, and
the MAC address of the first communication device or the second communication device is designated as the destination MAC address in the second frame.

14. The communication method according to claim 12, wherein:
the first communication device is configured to transmit the first frame through a communication channel identical to a communication channel used for communication over the first wireless network, and the second communication device is configured to search for the first frame by sequentially changing the communication channel.

15. The communication method according to claim 14, wherein the second communication device is configured to communicate over the second wireless network through the communication channel used for transmission of the first frame.

16. The communication method according to claim 11, wherein:
the first communication device and the second communication device are configured to execute an application program, and
the first identification value is included in the application program.

17. The communication method according to claim 11, wherein the second identification value is generated by changing a value of a specific bit in the MAC address of the first communication device.

18. The communication method according to claim 11, wherein the first identification value and the second identification value are set to a value different from all of the MAC address of the first communication device, the MAC address of the second communication device, and a broadcast address.

19. A communication device comprising:
processing circuitry configured to:
configure a first wireless network together with another peripheral device or a plurality of other peripheral devices by using a first basic service set identifier (BSSID), the first BSSID being identical to a media access control (MAC) address of the communication device;
store a first identification value in common to another communication device that configures a second wireless network together with another peripheral device or a plurality of other peripheral devices by using a second BSSID, the second BSSID being identical to a MAC address of the another communication device;
perform reception processing of a frame in which the first identification value has been designated as a BSSID, as a valid frame, in addition to a frame in which the first BSSID has been designated as the BSSID; and
transmit a first frame in which the first identification value has been designated as the BSSID,
wherein a second identification value different from the first identification value is transmitted by using the first frame so that the another communication device is controlled to receive the first frame and to store the second identification value included in the first frame.

20. A non-transitory computer-readable storage medium with an executable communication program stored thereon, the communication program being executable via a computer including a wireless transceiver, the communication program when executed causing the computer to perform operations comprising:
configuring a first wireless network together with another peripheral device or a plurality of other peripheral devices by using a first basic service set identifier (BSSID), the first BSSID being identical to a media access control (MAC) address of the computer;
storing a first identification value in common to another communication device that configures a second wireless network together with another peripheral device or a plurality of other peripheral devices by using a second BSSID, the second BSSID being identical to a MAC address of the another communication device;
performing reception processing of a frame in which the first identification value has been designated as a BSSID, as a valid frame, in addition to a frame in which the first BSSID has been designated as the BSSID; and
transmitting a first frame in which the first identification value has been designated as the BSSID,
wherein a second identification value different from the first identification value is transmitted by using the first frame so that the another communication device is controlled to receive the first frame and to store the second identification value included in the first frame.

* * * * *